United States Patent
Fisher et al.

(10) Patent No.: US 9,851,803 B2
(45) Date of Patent: Dec. 26, 2017

(54) AUTONOMOUS COMPUTING AND TELECOMMUNICATIONS HEAD-UP DISPLAYS GLASSES

(71) Applicant: eyeCam, LLC, San Francisco, CA (US)

(72) Inventors: Ronald Fisher, San Francisco, CA (US); Bryan Davis, San Francisco, CA (US); James Fisher, San Francisco, CA (US); Andrew Merit, San Francisco, CA (US); Paul Gautreaux, Dallas, TX (US)

(73) Assignee: EYECAM, LLC, San Francisco, CA (US)

( * ) Notice: Subject to any disclaimer, the term of this patent is extended or adjusted under 35 U.S.C. 154(b) by 32 days.

(21) Appl. No.: 14/214,673

(22) Filed: Mar. 15, 2014

(65) Prior Publication Data
US 2014/0266988 A1 Sep. 18, 2014

Related U.S. Application Data

(60) Provisional application No. 61/852,325, filed on Mar. 15, 2013.

(51) Int. Cl.
*G06F 3/01* (2006.01)
*G02B 27/01* (2006.01)
(Continued)

(52) U.S. Cl.
CPC .......... *G06F 3/017* (2013.01); *G02B 27/017* (2013.01); *G02B 27/0172* (2013.01);
(Continued)

(58) Field of Classification Search
CPC .......... G02B 27/017; G02B 2027/0138; G02B 2027/014; G02B 2027/0178; G02B 2027/0187; G02B 27/0172; G02B 27/0179; G02C 11/10; G06F 3/005; G06F 3/011; G06F 3/012; G06F 3/013; G06F 3/014; G06F 3/017; G06F 3/0426; G06F 3/0485; G06F 3/04886; H04N 5/23238; H04N 5/247
(Continued)

(56) References Cited

U.S. PATENT DOCUMENTS 4,659,197 A 4/1987 Weinblatt
4,796,987 A 1/1989 Linden
(Continued)

FOREIGN PATENT DOCUMENTS

WO 2014145166 A2 9/2014

OTHER PUBLICATIONS

International Search Report and Written Opinion dated Oct. 31, 2014 and issued on PCT/US14/29882, 19 pages.
(Continued)

*Primary Examiner* — Dmitriy Bolotin
(74) *Attorney, Agent, or Firm* — Franklin & Associates International Inc; Matthew F. Lambrinos

(57) ABSTRACT

A pair of eyeglasses has a frame and lenses mounted on the frame. A computer processor is mounted on eyeglasses together with a plurality of cameras and a digital projection system. IR sensors and/or dual zoom cameras may also be mounted on the glasses and configured to track the movement of the user's hand.

14 Claims, 25 Drawing Sheets

(51) Int. Cl.
  *G06F 3/042* (2006.01)
  *G06F 3/00* (2006.01)
  *G06F 3/0485* (2013.01)
  *G06F 3/0488* (2013.01)
  *H04N 5/232* (2006.01)
  *H04N 5/247* (2006.01)
  *G02C 11/00* (2006.01)

(52) U.S. Cl.
  CPC .......... *G02B 27/0179* (2013.01); *G02C 11/10* (2013.01); *G06F 3/005* (2013.01); *G06F 3/011* (2013.01); *G06F 3/012* (2013.01); *G06F 3/013* (2013.01); *G06F 3/014* (2013.01); *G06F 3/0426* (2013.01); *G06F 3/0485* (2013.01); *G06F 3/04886* (2013.01); *H04N 5/23238* (2013.01); *H04N 5/247* (2013.01); *G02B 2027/014* (2013.01); *G02B 2027/0138* (2013.01); *G02B 2027/0178* (2013.01); *G02B 2027/0187* (2013.01)

(58) Field of Classification Search
  USPC .......................................................... 345/8
  See application file for complete search history.

(56) References Cited

U.S. PATENT DOCUMENTS

| | | | |
|---|---|---|---|
| 6,292,213 B1 | 9/2001 | Jones | |
| 6,369,952 B1 | 4/2002 | Rallison | |
| 6,769,767 B2 | 8/2004 | Swab et al. | |
| 7,484,847 B2 | 2/2009 | Fuziak | |
| 7,542,665 B2 | 6/2009 | Lei | |
| 7,648,236 B1 | 1/2010 | Dobson | |
| 8,692,886 B2* | 4/2014 | Ennis | A42B 3/042 345/8 |
| 9,007,301 B1* | 4/2015 | Raffle | G09G 3/003 345/156 |
| 2002/0094845 A1 | 7/2002 | Inasaka | |
| 2005/0136949 A1 | 6/2005 | Barnes, Jr. | |
| 2007/0118426 A1 | 5/2007 | Barnes, Jr. | |
| 2007/0173266 A1 | 7/2007 | Barnes, Jr. | |
| 2009/0109292 A1* | 4/2009 | Ennis | A42B 3/042 348/158 |
| 2009/0189981 A1 | 7/2009 | Siann et al. | |
| 2009/0251661 A1 | 10/2009 | Fuziak | |
| 2009/0262205 A1 | 10/2009 | Smith | |
| 2009/0323975 A1 | 12/2009 | Groesch | |
| 2010/0039493 A1 | 2/2010 | Chao et al. | |
| 2010/0245585 A1 | 9/2010 | Fisher et al. | |
| 2011/0213664 A1 | 9/2011 | Osterhout | |
| 2011/0270522 A1* | 11/2011 | Fink | A63B 71/0622 701/532 |
| 2012/0127284 A1* | 5/2012 | Bar-Zeev | G02B 27/017 348/53 |
| 2012/0194418 A1 | 8/2012 | Osterhout | |
| 2012/0263449 A1* | 10/2012 | Bond | G03B 17/54 396/420 |
| 2013/0278631 A1* | 10/2013 | Border | G02B 27/017 345/633 |
| 2014/0063055 A1 | 3/2014 | Osterhout | |
| 2014/0266988 A1 | 9/2014 | Fisher et al. | |
| 2014/0267458 A1 | 9/2014 | Fisher et al. | |
| 2014/0269425 A1 | 9/2014 | Fisher et al. | |
| 2014/0300859 A1* | 10/2014 | Oz | G02B 27/225 351/201 |
| 2016/0299569 A1 | 10/2016 | Fisher | |

OTHER PUBLICATIONS

Office Action in U.S. Appl. No. 14/777,515 dated Dec. 16, 2016.
PCT application PCT/US14/29882 filed Mar. 15, 2014, entitled "Autonomous Computing and Telecommunications Head-Up Displays Glasses" in the name of eyeCAM LLC, 72 pages.
U.S. Appl. No. 14/777,515, filed Mar. 15, 2014, in the name of eyeCAM LLC.
U.S. Appl. No. 14/217,409, filed Mar. 17 2014, in the name of EyeCam, LLC.
U.S. Appl. No. 14/940,131, filed Nov. 12 2015, in the name of EyeCam, LLC.
U.S. Appl. No. 15/597,169, filed May 17 2017, in the name of EyeCam, LLC.

* cited by examiner

AUTONOMOUS COMPUTING AND TELECOMMUNICATIONS HEAD-UP DISPLAYS GLASSES

CROSS REFERENCE TO RELATED APPLICATIONS

This application claims the benefit under 35 U.S.C §119 (e) of U.S. provisional patent application No. 61/852,325, which was filed on Mar. 15, 2013 and which is incorporated here by reference in its entirety to provide continuity of disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERAL RIGHTS

N/A

BACKGROUND

Field of Invention

This invention pertains to the fields of mobile wearable computing and digital eyeglasses and telecommunications devices that incorporate various electronic features such as sensors, computer processors, data storage, battery powered cameras and audio-visual feedback mechanisms.

Related Art

The emerging product category of heads up display eyeglasses are gaining media exposure. These products typically incorporate a single forward-facing camera and a digital display positioned proximate to the eyeglass lens and off to one side so as to minimize the occlusion of the wearer's field of view.

SUMMARY OF THE INVENTION

According to one aspect, there is provided an apparatus which can comprise a pair of eyeglasses having a frame and lenses mounted on said frame; a computer processor mounted on said eyeglasses; a digital display mounted in one of said lenses and operably coupled to said processor; a plurality of digital cameras mounted on said eyeglasses and operably coupled to said processor; and a digital projection system mounted on said eyeglasses and operably coupled to said processor.

In one embodiment, Smart Eye Glasses have stereo digital cameras, stereo human-audio interface, directional microphones, eye-tracking sensors, and digital projection system ("Smart Glasses").

Purposes of the invention include enabling wearers of the device to use the autonomous computing and telecommunications glasses as primary phone, Internet to communicate wirelessly and to record and view live video feeds of their surroundings in the user's eyeglasses while interacting with these video feeds in a way that enables the wearer to be able to dynamically perform a variety of functions such as to automatically zoom in on objects of interest which are in the user's field of view or visible from one of the camera feeds and to communicate with said device using a variety of inputs such as eye movements, hand movements and finger gestures as well as voice commands and button selections.

The smart glasses can incorporate dual forward-facing cameras, enabling the camera to record wide angle and stereographic video or still image content. In addition, the smart glasses can incorporate side-facing and rear-facing cameras such that it is able to record a 360 degree surround video feed.

The cameras can incorporate electro magnetic, electrostatic or electromahical-mechanical optical zoom capabilities as well as digital zoom capabilities. With infrared enabled active auto-zoom and autofocusing system. The IR sensor enables low light and night vision.

These cameras can also incorporate directional electromechanical gimbal mounts, allowing them to pitch and yaw for greater directional control, according to some embodiments.

The eyeglasses can be selectively transparent or partially transparent, or opaque, according to some embodiments. In addition to a heads-up OLED display or Pico-Project system Heads-up display data can be projected into the eyeglasses such that it is superimposed onto the real-world view that the wearer sees through the glasses or it can replace the real-world view if the glasses opacity is increased.

Dual inward-facing eye motion tracking sensors are integrated into the frame of the eyeglasses above the left and right eyes. These give the smart glasses the ability to track the wearer's eye movements as well as determine the wearer's distant point of focus. Eye tracking can be used to control a wide variety of device functions including the cameras' zoom functions and the integrated telecommunications functions. For example, the user can direct the device to scroll a surround video feed left or right, simply by looking left or right. Alternatively, in another mode, the edges and corners of the user's heads-up display glasses can be logically mapped to represent a bird's eye view of the surrounding scene. To instruct the smart glasses to display the video feed from the rear-facing cameras, the user can briefly look down, to display video from the right, the user looks to the right of the display and to display video from the front, the user looks up.

IR Sensor, IR mapping, auto zoom adequately covered?

Gesture commands using one or both hands can be used to control the smart glasses various functions. For example, one hand can be held in front of the camera and views selected to be zoomed in or out of using finger gestures. Using the IR sensors and the dual zoom cameras the smart glasses are able to dynamically detect and adapt to this scenario, so that the zoom camera most proximate to the hand takes on the role of focusing on the hand while the other camera continues to feed video footage of the scene to the head-up display. In addition, the smart glasses are able to mask the user's hand(s) by detecting its position in front of the wearer and intelligently substituting video from the other camera to cover the arc of view obscured by the hand. The two cameras' video feeds can be automatically stitched together to provide a seamless wide angle or panoramic view of the scene without the hand appearing in it. Said video can be recorded or streamed live to the wearer's heads-up display.

The smart glasses can also incorporate multi-directional audio, as well as the ability to select and amplify audio from a specific target object or direction and to feed and store audio such that it can be associated with its associated zoom video. Both in playback and live streaming modes, the viewer can selectively focus on a particular subject area of the video and listen to the amplified sound recorded from that particular direction.

The wearer is able to optionally use head motion to activate the video scroll feature. The device is able to differentiate between when the user has turned his or her head and when he has turned his or her entire body to face a new direction. This can be done by detecting the orientation of the user's body or shoulders, using downward-facing cameras or IR sensors, according to some embodiments. To scroll in one direction using this mode, the user turns his or head in that direction and to pause the scrolling, the user turns his or her head back to the forward neutral position. The degree of head turn can control the speed of the scrolling action.

Audio Input Control

Gyroscopic Motion Sensors, Accelerometers, GPS wifi-mobile communications device, a digital audio driver for sending audio feedback to the wearer's ears, a battery, a computer processor, a power management unit, and a forward-facing cameras and camera driver. Integrated audio-visual logic component or driver, a user interface logic component or driver, a computer processor, a mini SD memory card for external data storage, etc.

In another embodiment, the smart glasses can incorporate retractable, cameras that are on bendable or omni-directional mounts, enabling the user to custom orient each of these cameras in his or her preferred directions. For example, for certain sports a user may wish to capture video from above and/or below the head's natural orientation. These retractable cameras can also be oriented to provide an improved view behind the head (particularly if the rear camera support is not being used) and also around the wearer's hair.

In addition, the device has the ability to wirelessly stream surround video and audio or stereoscopic video or selected video feeds from individual cameras to the heads-up-display of another wearer of the one of these devices. Said wireless communication can take place though various communications protocols and systems, including but not limited to WiFi, Bluetooth, mobile phone cellular networks, etc.

DETAILED DESCRIPTION OF PREFERRED EMBODIMENTS

Figure 1:
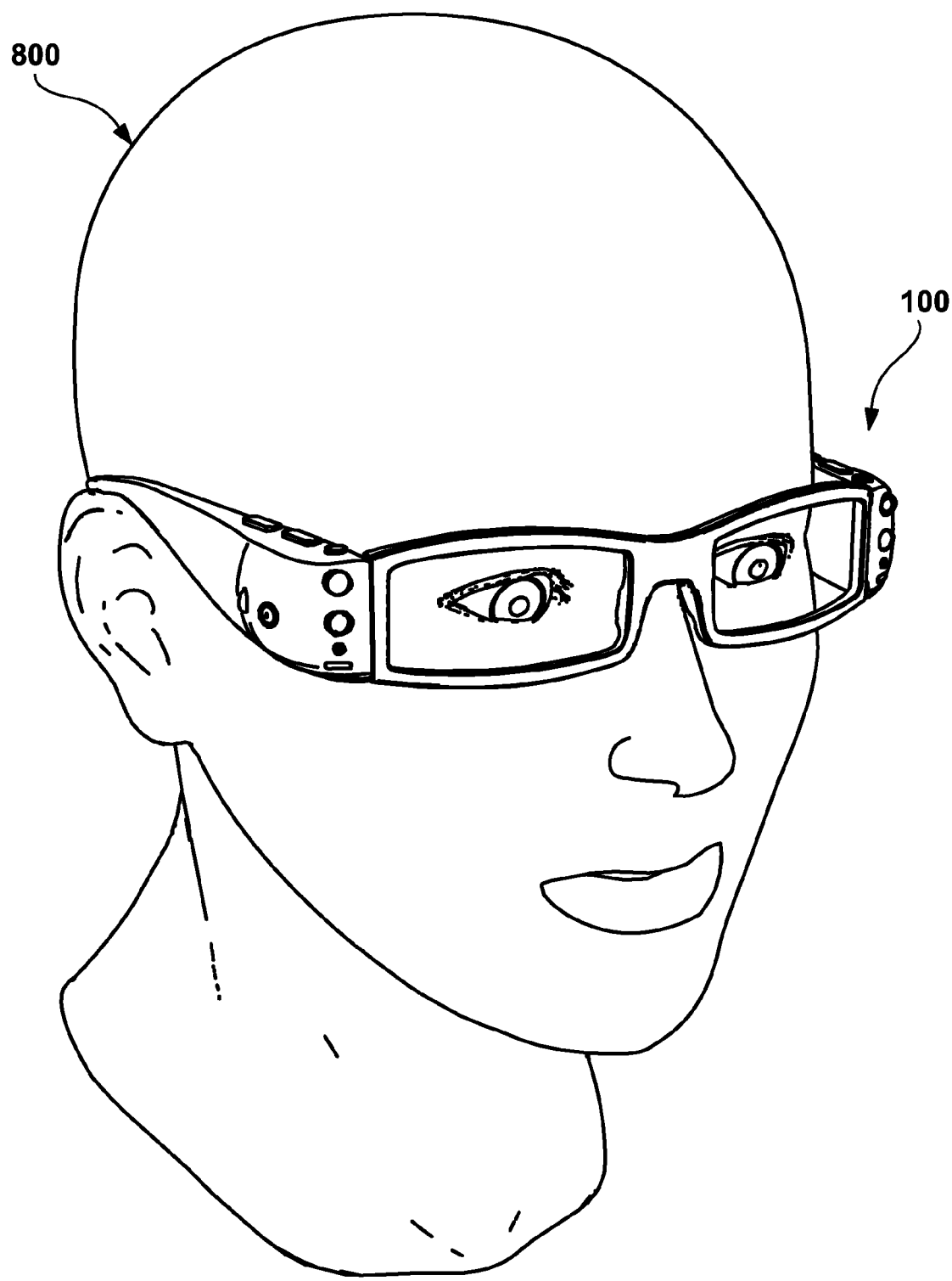
FIGS. 1 through 2C illustrate a pair of smart glasses according to one embodiment.

Several embodiments are specifically illustrated and/or described herein. However, it will be appreciated that modifications and variations are covered by the above teachings and within the scope of the appended claims without departing from the spirit and intended scope thereof.

Technical features described in this application can be used to construct various embodiments of autonomous computing and telecommunications eye glasses.

According to one aspect, there is provided autonomous computing and multi-channel telecommunications head-up displays glasses with dual POV optical zoom and autofocusing cameras, infra-red light and sensor array and side and rear view multi-directional lens array for 360 degree image and video.

In one approach, embodiments comprise Smart Eye Glasses with stereo digital cameras, stereo human-audio interface, directional microphones, eye-tracking sensors, and digital projection system ("Smart Glasses").

In one approach, purposes of the invention include enabling wearers of the device to use the autonomous computing and telecommunications glasses as primary phone, Internet to communicate wirelessly and to record and view live video feeds of their surroundings in the user's eyeglasses while interacting with these video feeds in a way that enables the wearer to be able to dynamically perform a variety of functions such as to automatically zoom in on objects of interest which are in the user's field of view or visible from one of the camera feeds and to communicate with said device using a variety of inputs such as eye movements, hand movements and finger gestures as well as voice commands and button selections.

According to some embodiments, the smart glasses can incorporate dual forward-facing cameras, enabling the camera to record wide angle and stereographic video or still image content. In addition, the smart glasses can incorporate side-facing and rear-facing cameras such that it is able to record a 360 degree surround video feed.

According to some embodiments, the cameras can incorporate electro magnetic, electro-static or electromechnical-mechanical optical zoom capabilities as well as digital zoom capabilities. With infrared enabled active auto-zoom and autofocusing system. The IR sensor enables low light and night vision. These cameras can also incorporate directional electro-mechanical gimbal mounts, allowing them to pitch and yaw for greater directional control, according to some embodiments.

The eyeglasses can be selectively transparent or partially transparent, or opaque, according to some embodiments. In addition to a heads-up OLED display or Pico-Project system Heads-up display data can be projected into the eyeglasses such that it is superimposed onto the real-world view that the wearer sees through the glasses or it can replace the real-world view if the glasses opacity is increased.

Dual inward-facing eye motion tracking sensors are integrated into the frame of the eyeglasses above the left and right eyes. These give the smart glasses the ability to track the wearer's eye movements as well as determine the wearer's distant point of focus. Eye tracking can be used to control a wide variety of device functions including the cameras' zoom functions and the integrated telecommunications functions. For example, the user can direct the device to scroll a surround video feed left or right, simply by looking left or right. Alternatively, in another mode, the edges and corners of the user's heads-up display glasses can be logically mapped to represent a bird's eye view of the surrounding scene. To instruct the smart glasses to display the video feed from the rear-facing cameras, the user can briefly look down, to display video from the right, the user looks to the right of the display and to display video from the front, the user looks up.

Gesture commands using one or both hands can be used to control the smart glasses various functions. For example, one hand can be held in front of the camera and views selected to be zoomed in or out of using finger gestures. Using the IR sensors and the dual zoom cameras the smart glasses are able to dynamically detect and adapt to this scenario, so that the zoom camera most proximate to the hand takes on the role of focusing on the hand while the other camera continues to feed video footage of the scene to the head-up display. In addition, the smart glasses are able to mask the user's hand(s) by detecting its position in front of the wearer and intelligently substituting video from the other camera to cover the arc of view obscured by the hand. The two cameras' video feeds can be automatically stitched together to provide a seamless wide angle or panoramic view of the scene without the hand appearing in it. Said video can be recorded or streamed live to the wearer's heads-up display.

The smart glasses can also incorporate multi-directional audio, as well as the ability to select and amplify audio from a specific target object or direction and to feed and store audio such that it can be associated with its associated zoom video. Both in playback and live streaming modes, the viewer can selectively focus on a particular subject area of the video and listen to the amplified sound recorded from that particular direction.

The wearer is able to optionally use head motion to activate the video scroll feature. The device is able to differentiate between when the user has turned his or her head and when he has turned his or her entire body to face a new direction. This can be done by detecting the orientation of the user's body or shoulders, using downward-facing cameras or IR sensors, according to some embodiments. To scroll in one direction using this mode, the user turns his or head in that direction and to pause the scrolling, the user turns his or her head back to the forward neutral position. The degree of head turn can control the speed of the scrolling action.

In some embodiments, the smart glasses have audio input control, gyroscopic motion sensors, accelerometers, GPS wifi-mobile communications device, a digital audio driver for sending audio feedback to the wearer's ears, a battery, a computer processor, a power management unit, and a forward-facing cameras and camera driver. Integrated audio-visual logic component or driver, a user interface logic component or driver, a computer processor, a mini SD memory card for external data storage, etc.

In another embodiment, the smart glasses can incorporate retractable, cameras that are on bendable or omni-directional mounts, enabling the user to custom orient each of these cameras in his or her preferred directions. For example, for certain sports a user may wish to capture video from above and/or below the head's natural orientation. These retractable cameras can also be oriented to provide an improved view behind the head (particularly if the rear camera support is not being used) and also around the wearer's hair.

In addition, the device has the ability to wirelessly stream surround video and audio or stereoscopic video or selected video feeds from individual cameras to the heads-up-display of another wearer of the one of these devices. Said wireless communication can take place though various communications protocols and systems, including but not limited to WiFi, Bluetooth, mobile phone cellular networks, etc.

Reference will now be made to the drawings in which the various elements of embodiments will be given numerical designations and in which embodiments will be discussed so as to enable one skilled in the art to make and use the invention.

Specific reference to components, process steps, and other elements are not intended to be limiting. Further, it is understood that like parts bear the same reference numerals, when referring to alternate figures. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 2A:
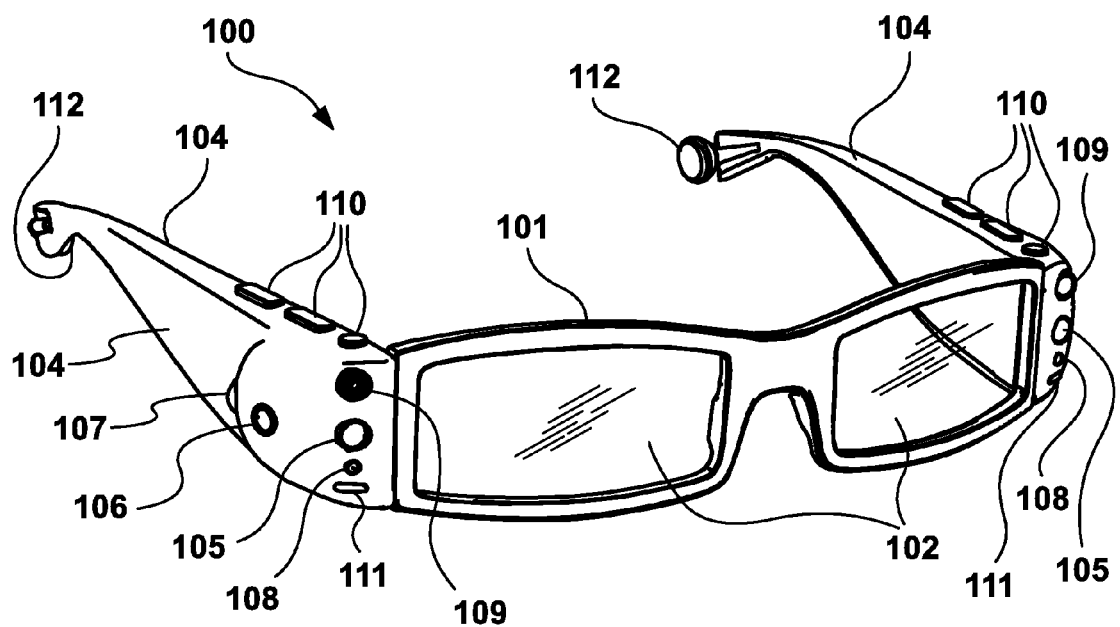
Figure 2B:
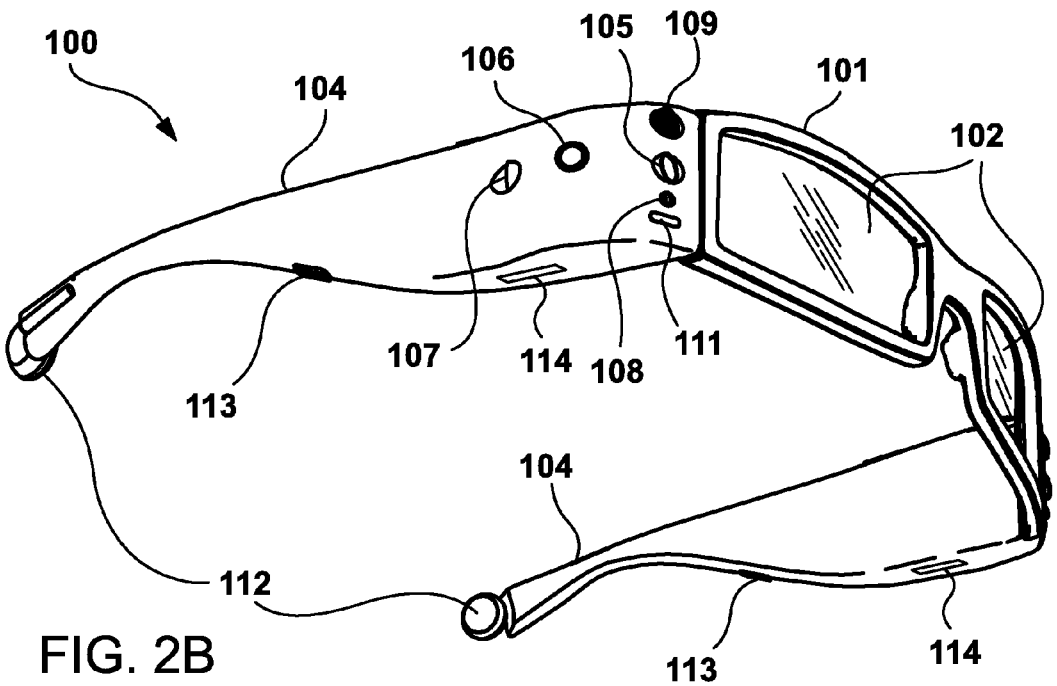
Figure 2C:
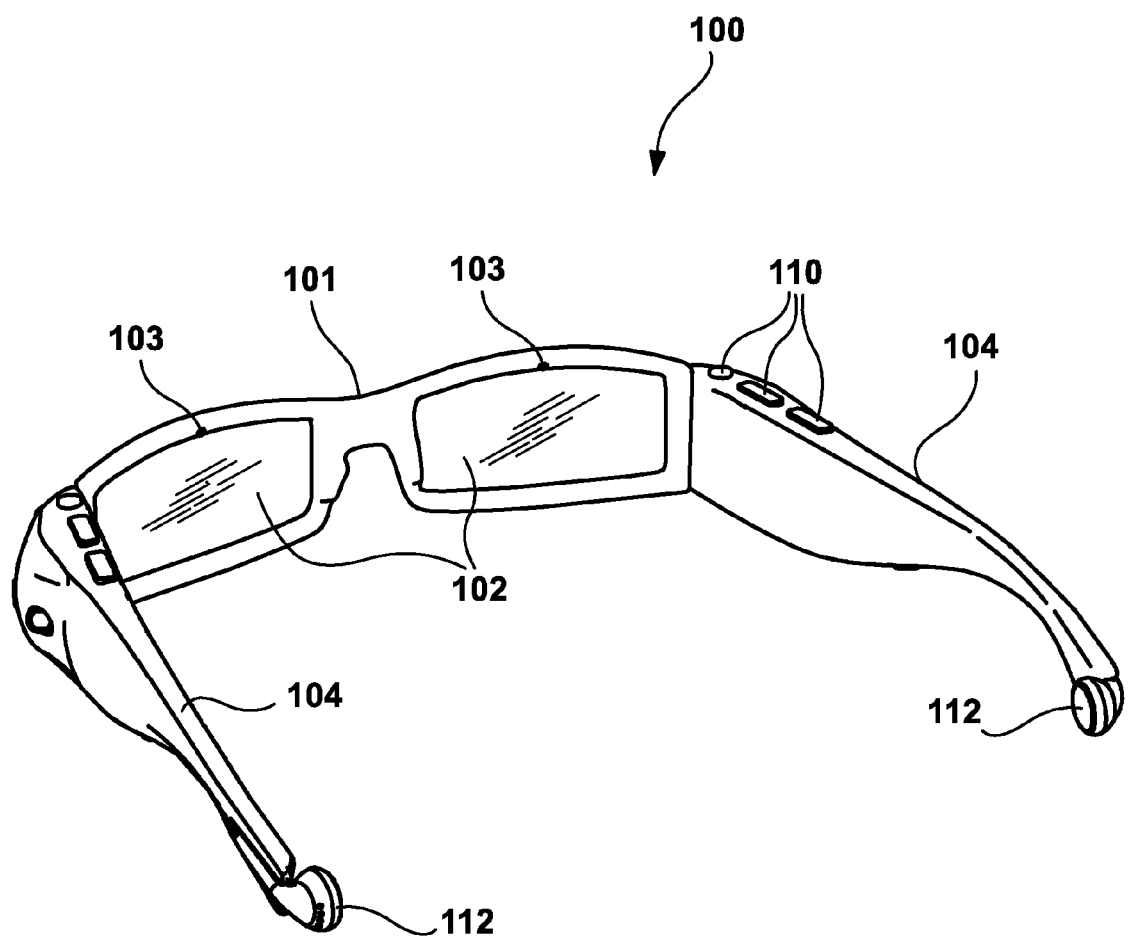

Reference will now be made to FIGS. 1 through 2C which illustrate a pair of smart glasses according to some embodiments. A pair of smart glasses 100 are shown on a human head 800. The smart glasses integrate dual forward-facing digital cameras 105 as well as digital optical cameras which face to the sides and the rear of the wearer. The smart glasses can incorporate digital displays 102 in the eyeglasses, which, according to some embodiments are able to function as head-up displays, allowing to the wearer to see through said eyeglasses and or focus on digital content which can be displayed in the eyeglasses.

In addition there are detachable stereo wireless earphones 112, which can be stored in or on the glasses, according to some embodiments and inserted in the user's ears when needed. Said wireless earphones incorporate a power source (battery) and wireless communications electronics, such as a Bluetooth transceiver, which is able to communicate directly with similar communications electronics in the smart glasses, thereby allowing the smart glasses to transmit audio to the wearer's ears. In addition to the optical cameras, the front of each side of the smart glasses can incorporate an infra-red sensor and infra-red camera, according to some embodiments. The smart glasses also integrate eye tracking sensors 103 above each eye, so that the user is able to communicate with the smart glasses using eye movements and the smart glasses are able to continually monitor eye movement to determine the wearer's visual focus and point of interest and accordingly adapt its video feeds to on-board digital memory and to the wearer's display, according to some embodiments. Dual multi-directional microphones in each arm 104 are able to track and record sound in three dimensions. The ear phones 112 are able to reproduce three-dimensional surround sound so that the wearer is able to sense directionality related to video feeds that are projected in the eyeglass head-up-displays. Internal rechargeable batteries provide power to all of the integrated electronic components. The precise arrangement of the described electronic components can vary.

The smart glasses can also incorporate interface ports for charging the internal batteries as well as data download and upload. In addition, the arms 104 of the smart glasses can incorporate ports or slots 114 for the insertion of memory cards, such as SD cards. These interface ports and memory card slots 114 are depicted as integrated underneath each of the arms, according to some embodiments. Internal electronics and contacts integrated into the hinge areas between the arms and the eyeglass frame 101 provide for data communication and power feeds between the arms and the eyeglass frame.

Figure 3A:
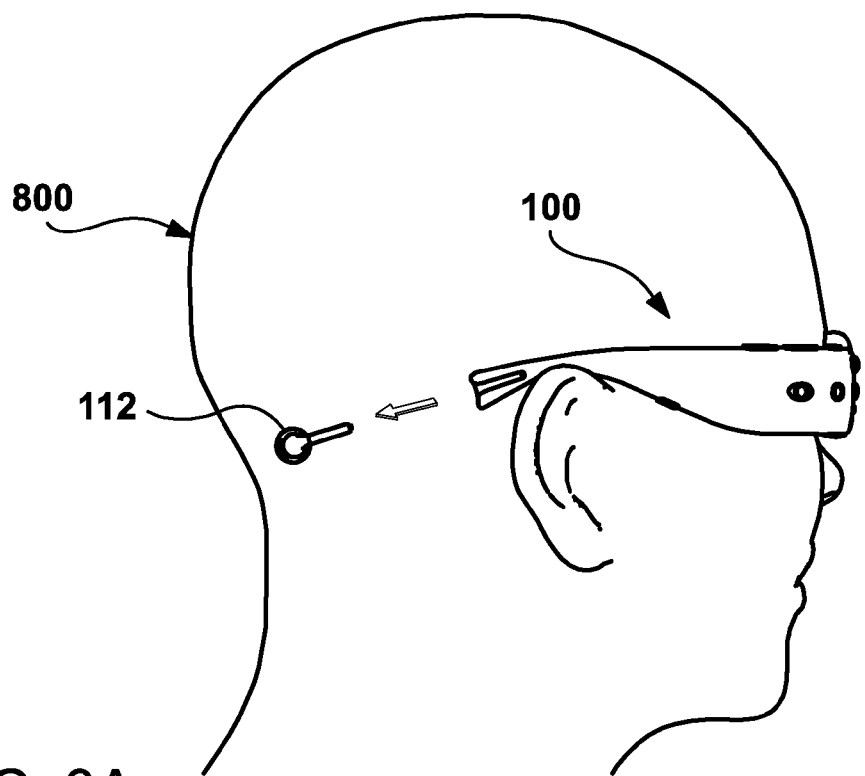
FIGS. 3A and 3B illustrate smart glasses including detachable wireless earphones according to some embodiments.
Figure 3B:
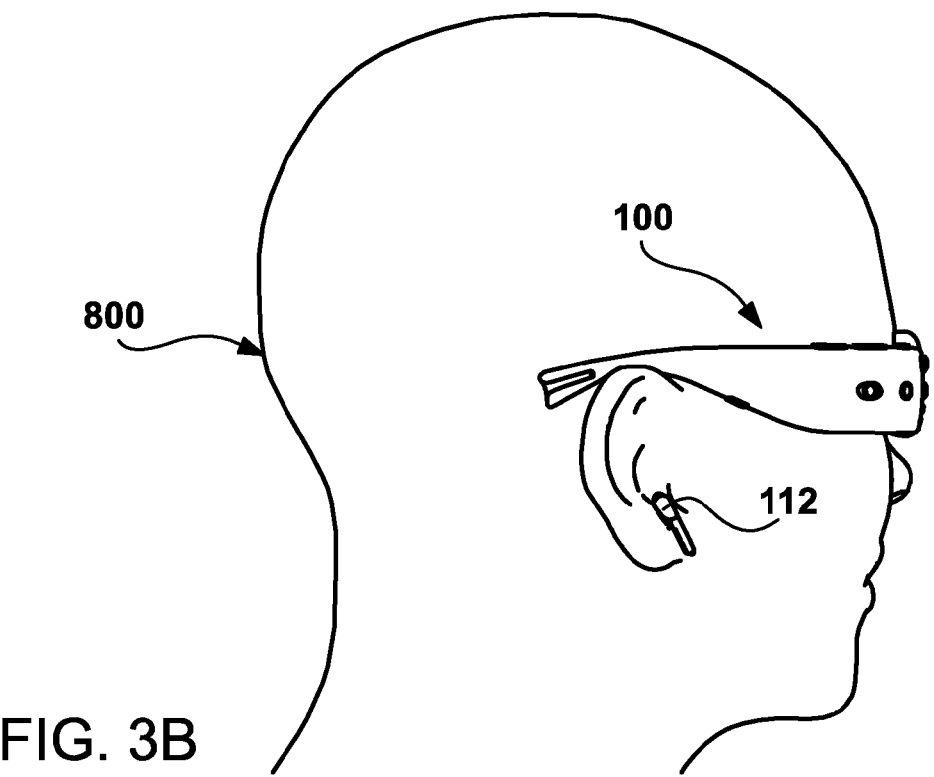

Referring now to FIGS. 3A and 3B, which illustrate smart glasses including detachable wireless earphones according to some embodiments, the figures illustrate how the wireless earphones 112 can be detached by the wearer from their docking-charging stations in the smart eyeglasses and then worn in the ears.

Figure 4A:
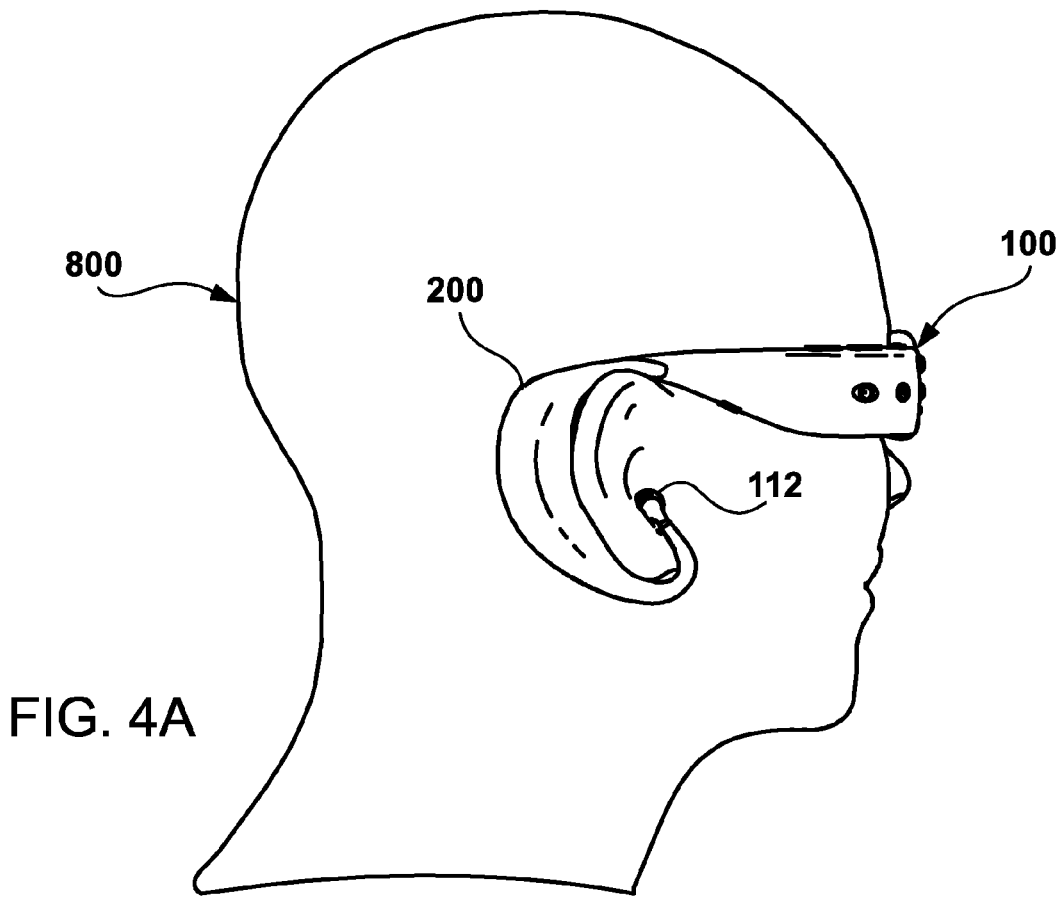
FIGS. 4A through 4B smart glasses including attachable external batteries according to some embodiments.
Figure 4B:
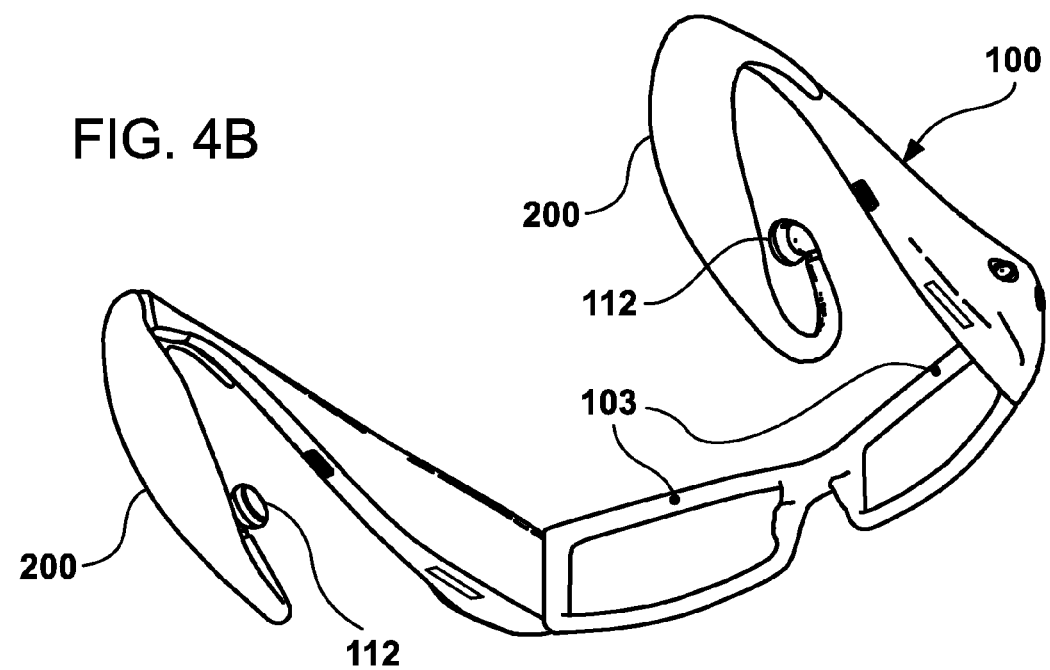

FIGS. 4A through 4B illustrate smart glasses including attachable external batteries according to some embodiments. As shown in FIG. 4A through C, attachable external batteries 200 can attach to the arms 104 of the smart glasses, according to some embodiments. Said attachable external batteries can also support and power the detachable wireless earphones 112, according to some embodiments. These batteries 200 can also provide a electronic communications pass-through to the ear phones 112 so that transmission of audio data to them from the smart glasses 100 can be wired rather than wireless. Said external batteries 200 can use the same docking port that is used for storage and charging of the wireless earphones 112 to connect to the arms 104 of the smart glasses 100, according to some embodiments. The smart glasses 100 are able to intelligently and dynamically switch power sources, so that it will always deplete the external batteries 200 before depleting its internal batteries. In addition, the smart glasses 100 will automatically recharge the internal batteries 200 and the earphone batteries from the external batteries whenever they are connected.

Figure 5A:
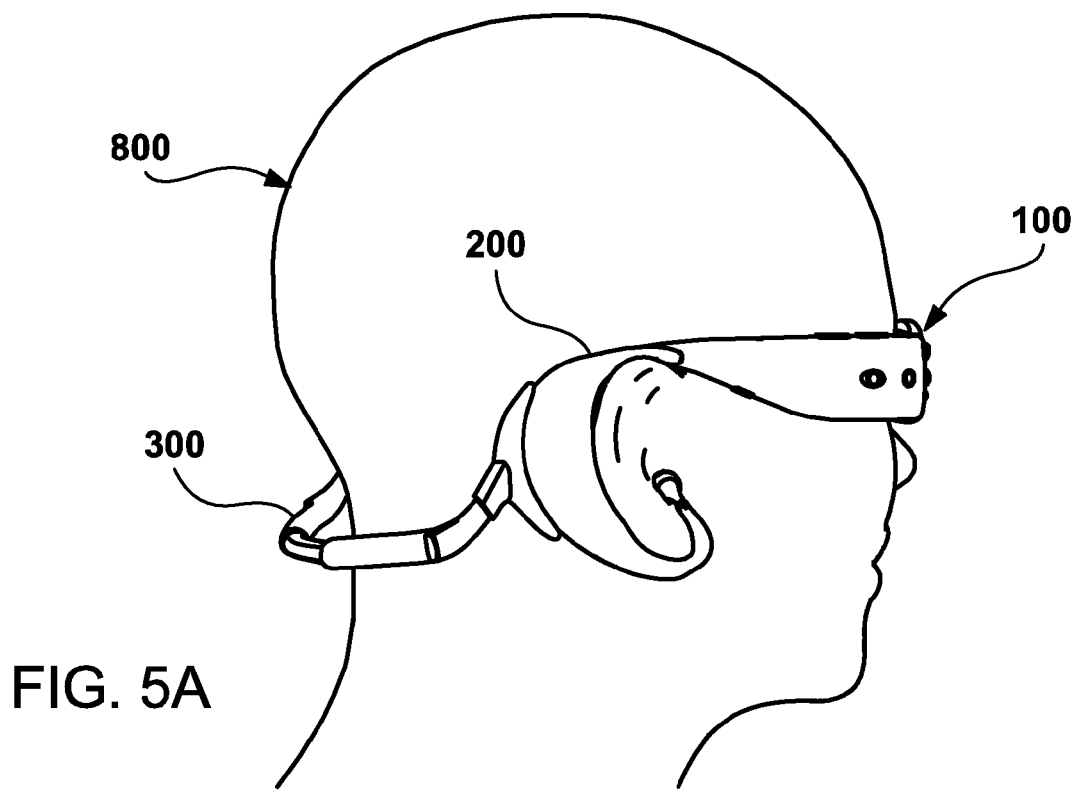
FIGS. 5A and B through 6A and B illustrate an attachable external rear camera support for the smart glasses according to some embodiments.
Figure 5B:
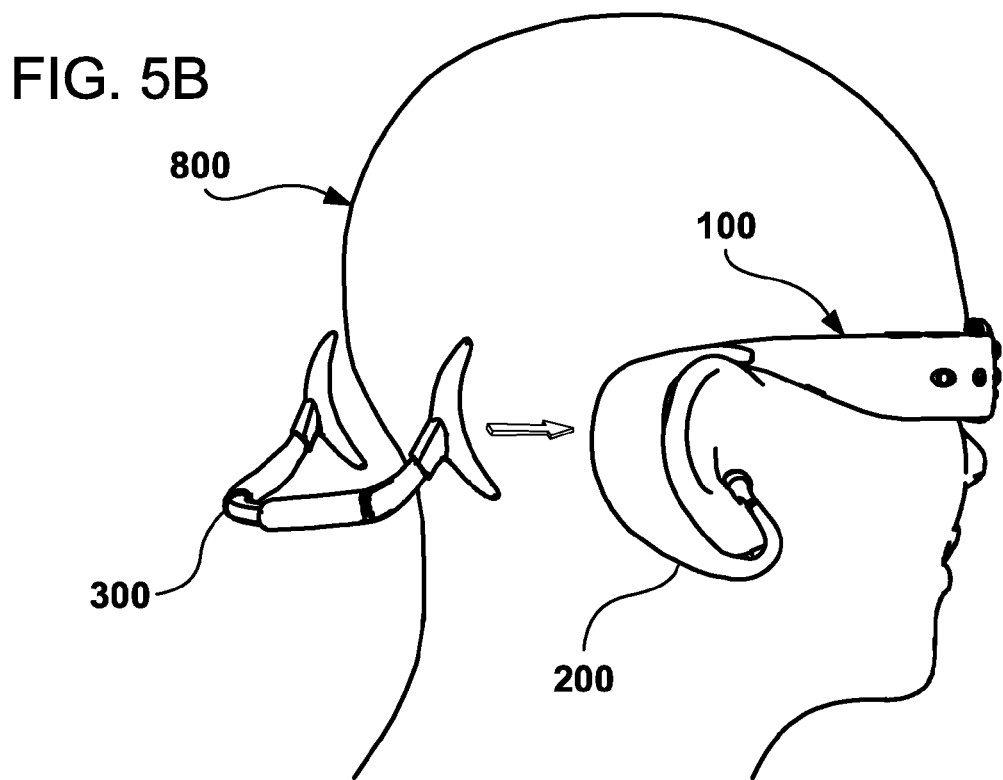
Figure 6A:
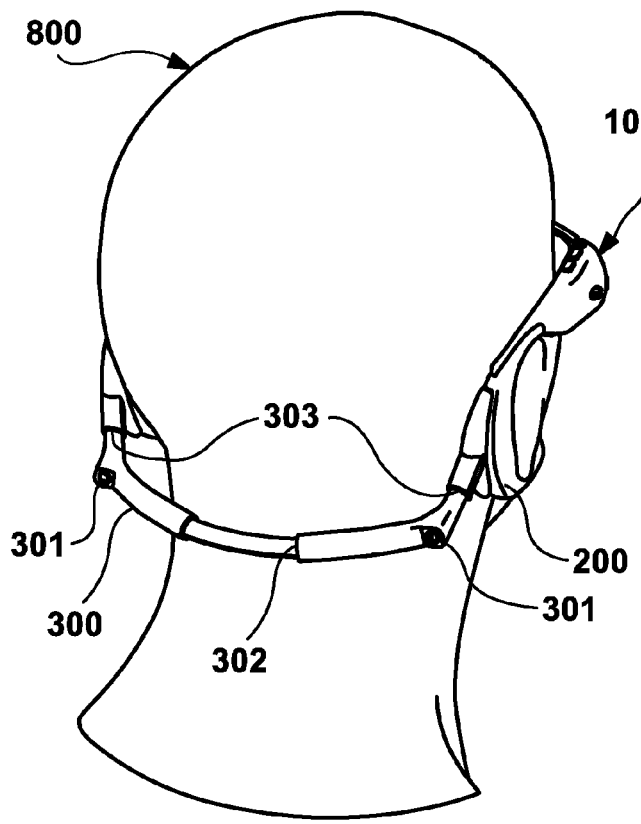
Figure 6B:
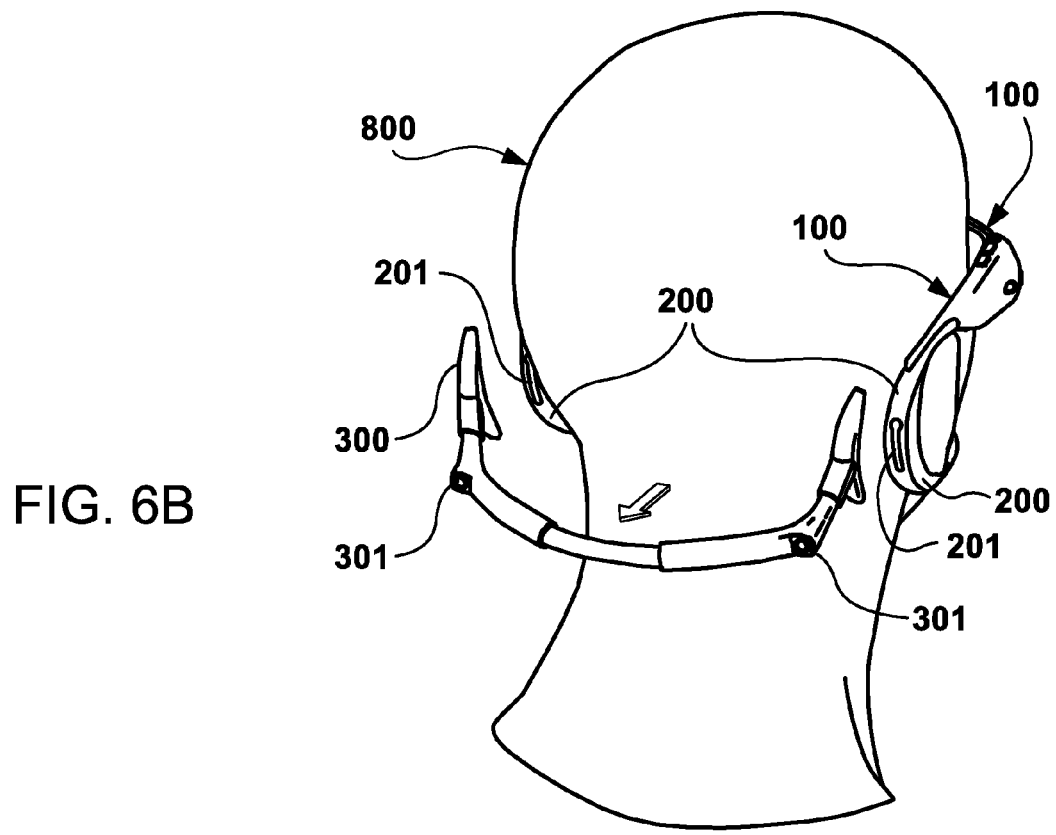

FIGS. 5A and B through 6A and B illustrate an attachable external rear camera support for the smart glasses according to some embodiments. As depicted in FIGS. 5A and B through 6A and B, the attachable external rear camera support 300 wraps behind the neck and provides additional support for the smart glasses 100 and to provide rear video feeds from its integrated stereo cameras. Said rear camera support allows the user to secure the smart glasses to his or her head for active use such as during sports and to also record full 360 degree panoramic video. Said rear camera support 300 can attach to the external batteries 200, as depicted, according to some embodiments. In other embodiments not depicted here, the rear camera support 300 can attach directly to the smart glasses 100 and can optionally incorporate its own internal battery. Said rear camera support 300 can be adjustable to allow for people of different size and shape to customize the fit. It can adjust out enough to wrap around hair of varying volume. In the depicted embodiments, sheaths 302 allow for the rear camera support 300 to be extended in its width, as well as to be extended out and down.

Figure 7A:
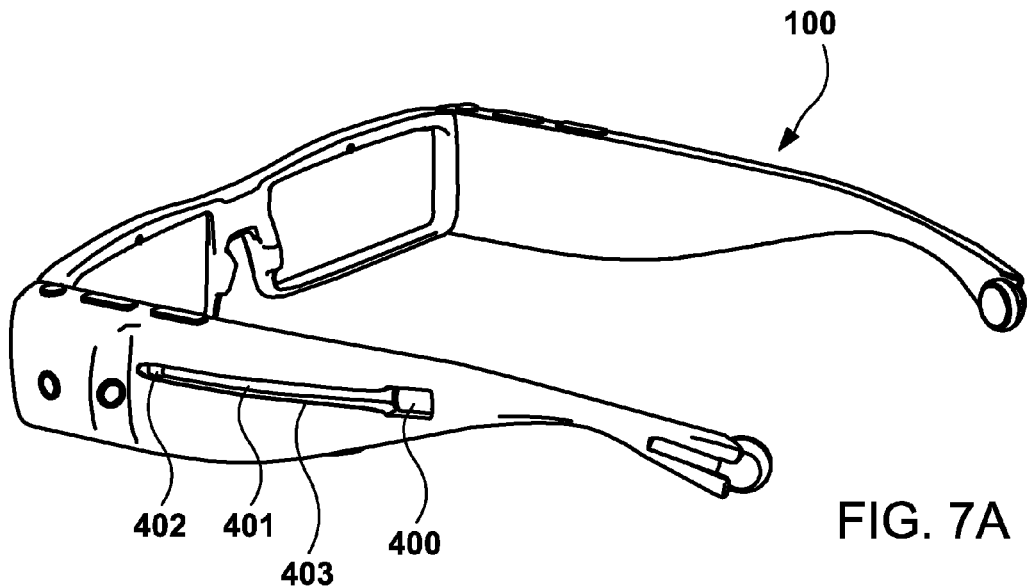
FIGS. 7A and B depict a pair of smart glasses according to some embodiments.
Figure 7B:
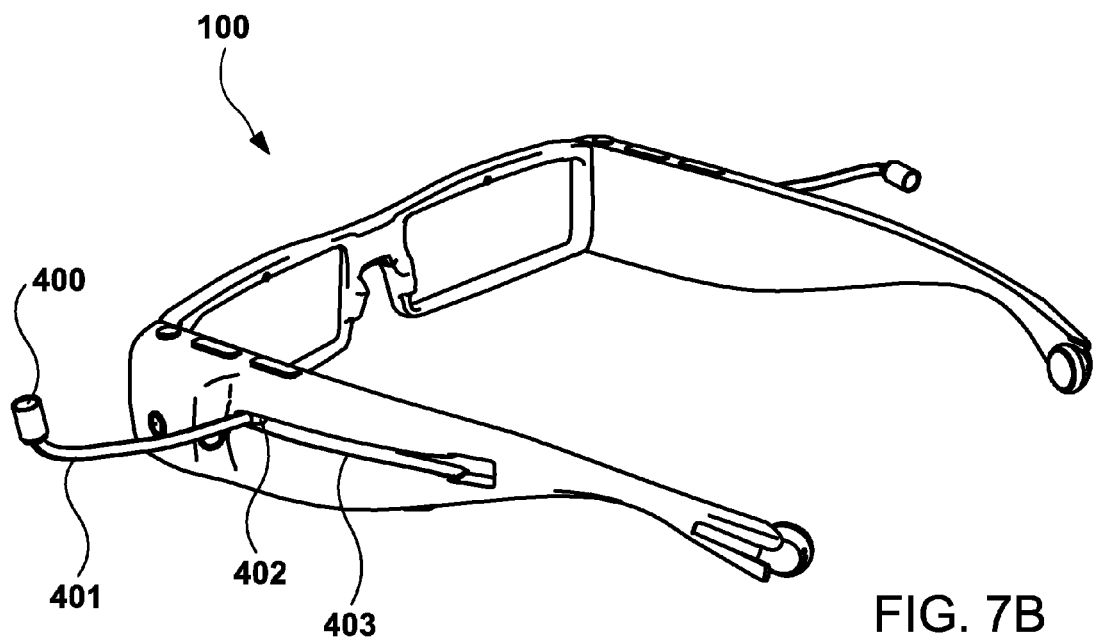

FIGS. 7A and B depict a pair of smart glasses according to some embodiments

As depicted in FIGS. 7A and B, a pair of smart glasses 100 in which the arms of the devices integrate extendable, cameras 400 that are on multi-directional bendable supports 401, according to some embodiments. In the depicted embodiment, these extendable cameras 400 are able to be stored inside recessed tracks 403 in the arms of the smart glasses 100 when not in use and can be swiveled out and bent into the desired orientation as desired.

Figure 8A:
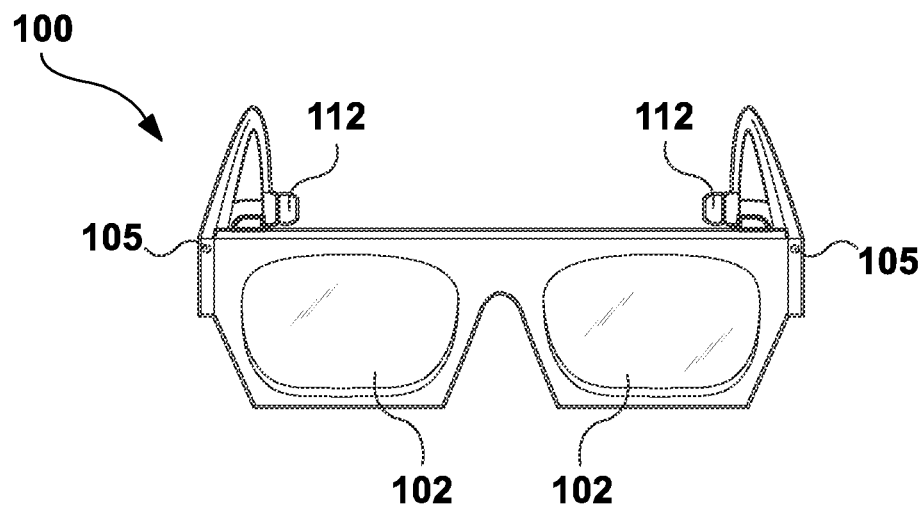
FIGS. 8A and 8B depict simplified embodiments of the smart glasses.
Figure 8B:
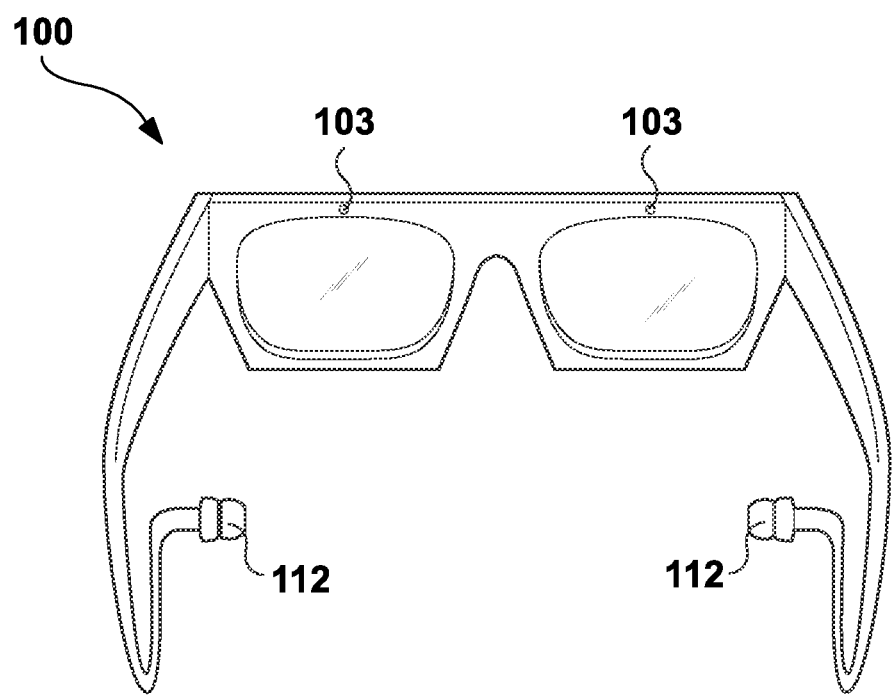

FIGS. 8A and 8B depict simplified embodiments of the smart glasses according to some embodiments. FIGS. 8A and 8B emphasize the head-up display eyeglasses 100 and the optical motion sensors 105 as well as the integrated earphones 112, according to some embodiments. In this particular embodiment, the earphones are connected to the arms of the smart glasses. These may also be separable and/or wired or wireless, as depicted in earlier figures.

Figure 9A:
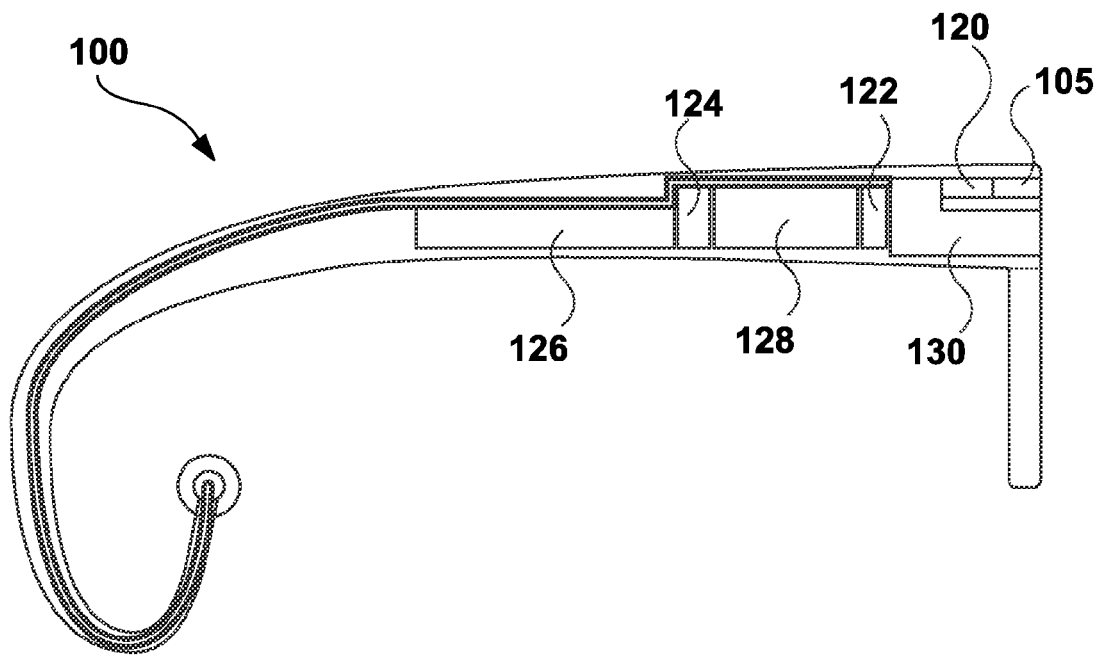
FIGS. 9A and 9B illustrate right and left side views respectively of the smart glasses according to some embodiments.
Figure 9B:
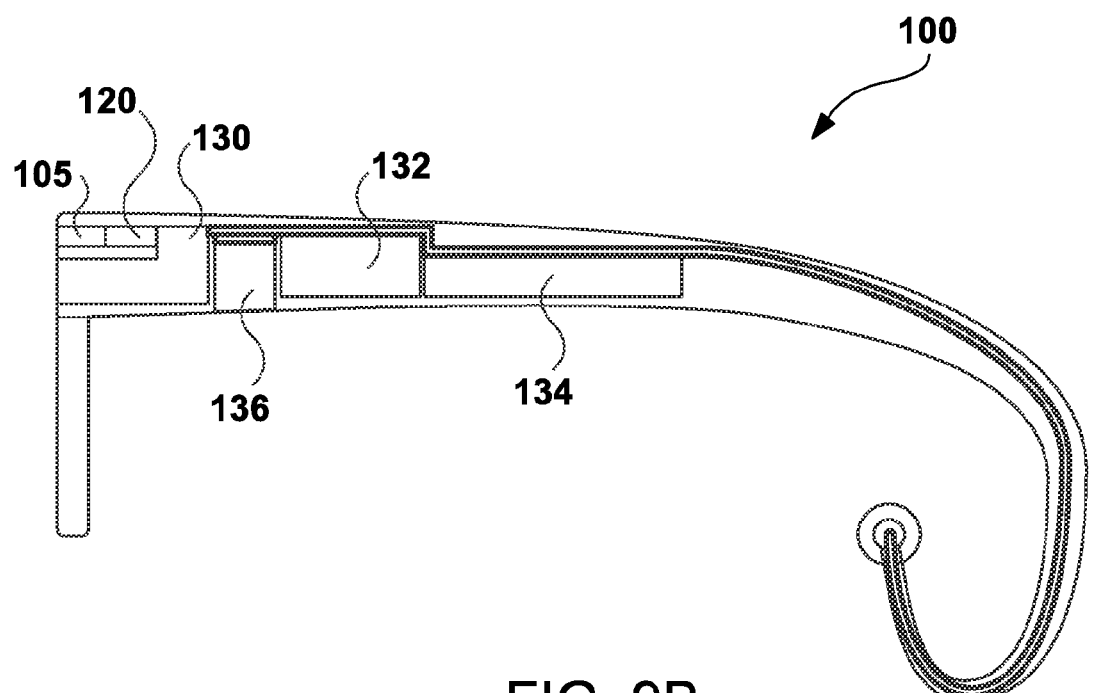

FIGS. 9A and 9B illustrate right and left side views respectively of the smart glasses according to some embodiments. Internal electronic components integrated into the arms of the glasses are symbolized. The precise arrangement of said electronic components can vary. In the depicted embodiment in FIG. 9A, the right eyeglass arm can be seen with a wifi-mobile communications device 126, a digital audio driver 124 for sending audio feedback to the wearer's ears, a battery 128, a computer processor 130, a power management unit 122, and a forward-facing camera 105 and camera driver 120. In FIG. 9B, the left eyeglasses arm can be seen with integrated audio-visual logic component or driver 134, a user interface logic component or driver 132, a computer processor 130, a mini SD memory card 136 for external data storage, and a camera 105 and camera driver 120.

Figure 10A:
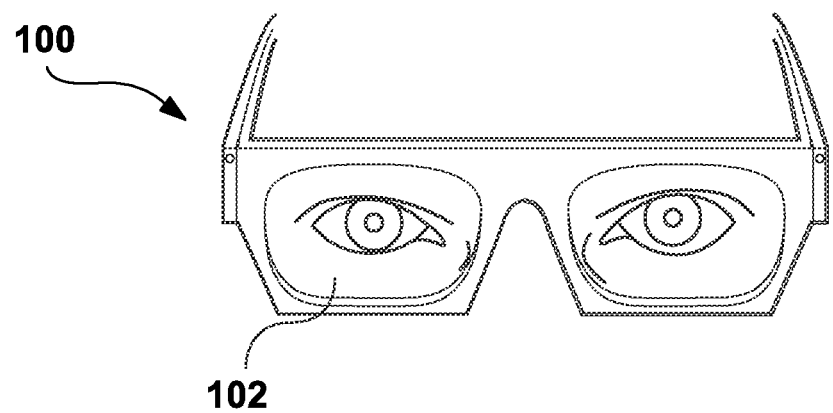
FIG. 10A depicts a frontal perspective view of the heads-up display glasses according to some embodiments.

FIG. 10A depicts a frontal perspective view of the heads-up display glasses according to some embodiments. In FIG. 10A, the glasses 100 are shown in their fully transparent state, allowing the wearer an unobstructed view of the real world.

Figure 10B:
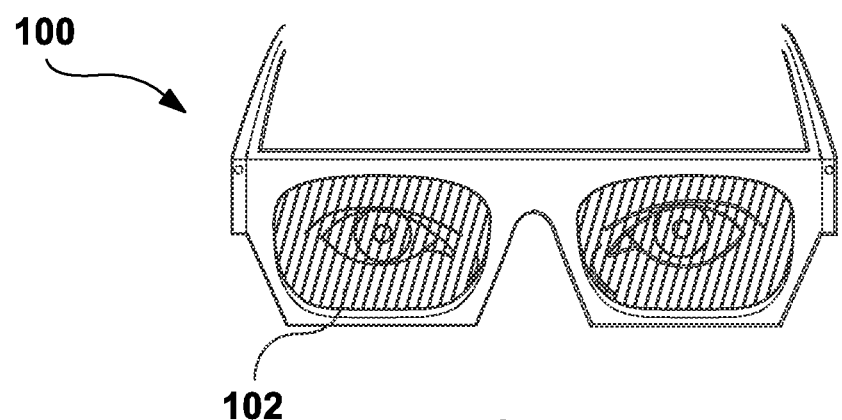
FIG. 10B depicts a frontal perspective view of the heads-up display eyeglasses according to some embodiments.

FIG. 10B depicts a frontal perspective view of the heads-up display eyeglasses according to some embodiments. In FIG. 10B, the glasses are shown in a translucent or partially opaque state. The heads-up display glasses are able to display video or computer-generated content such that it is translucent, providing the user with the ability to monitor the real world in front of him or her. In addition, the opacity of the lenses 102 can be dynamically altered based on ambient lighting conditions or to filter direct sunlight.

Figure 10C:
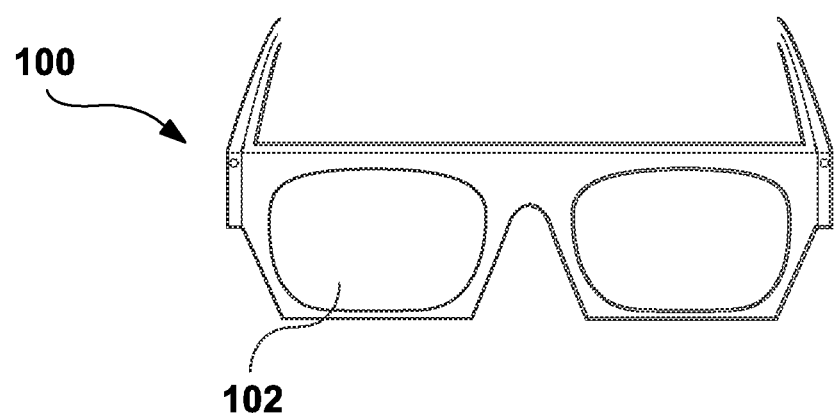
FIG. 10C depicts a frontal perspective view of the heads-up display eyeglasses according to some embodiments.
Figure 11A:
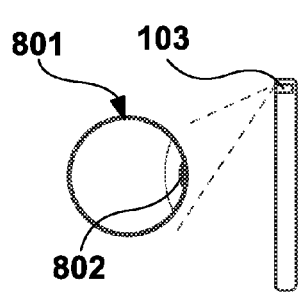
FIGS. 11A through 11D depicts the eye tracking sensors with and without smart glasses according to some embodiments.
Figure 11B:
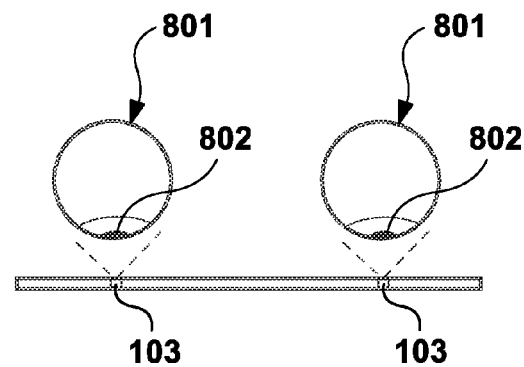
Figure 11C:
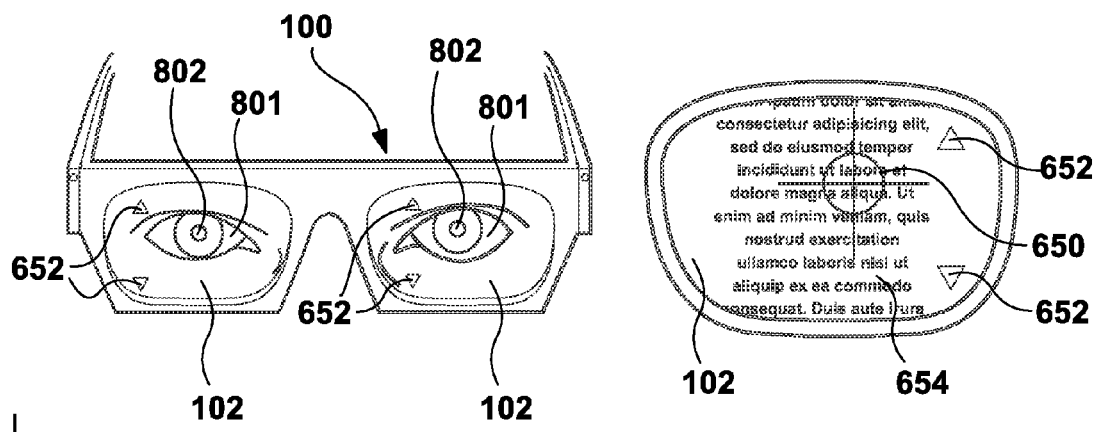
Figure 11D:
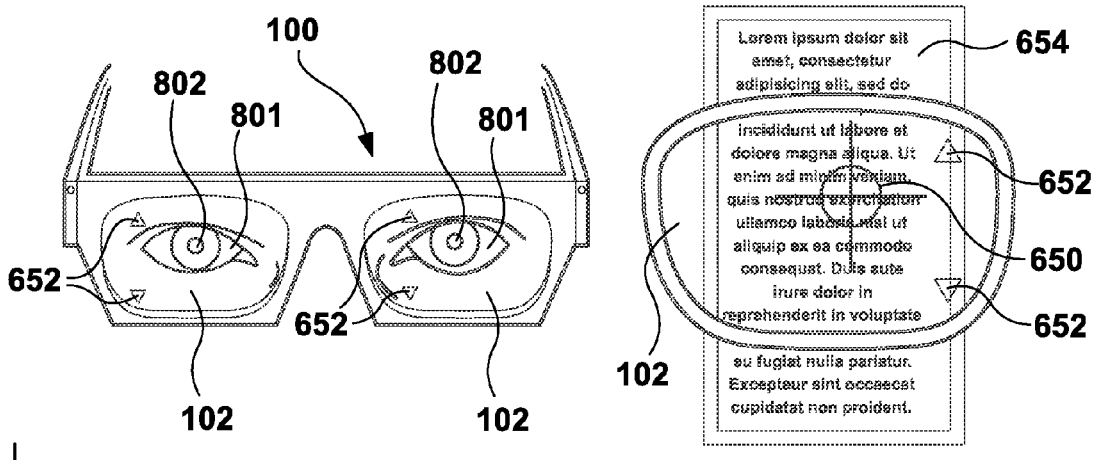

FIG. 10C depicts a frontal perspective view of the heads-up display eyeglasses according to some embodiments. In FIG. 10C, the glasses are in an opaque or mostly opaque state, for optimal viewing of heads-up display imagery.

FIGS. 11A through 11D depicts the eye tracking sensors with and without the smart glasses according to some embodiments. FIGS. 11A to 11D show how eye tracking sensor 103 can be used to enable the user to give instructions or cues to the smart glasses' internal computer processor so that it can act on said cues and accordingly perform pre-programmed functions. In the depictions, using the eye-tracking sensors 103, the smart glasses are able to track where on the screen the eyes 801,802 are focused both on the vertical and horizontal axes. In this way it is able to, for example, detect when the wearer has read toward the bottom of a page and automatically scroll the content up. Likewise, the user is able to scroll the page down by looking toward the top of the screen. For wide images, the user can similarly look toward the left or right of the screen and the display content will automatically scroll across to the right or left, respectively.

Figure 12A:
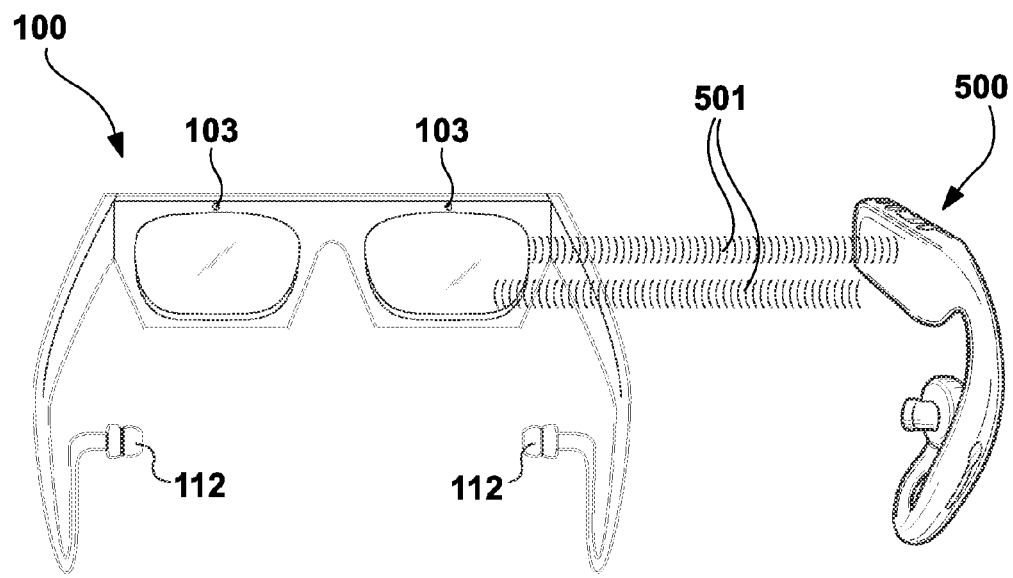
FIGS. 12A and 12 B depict wireless communication between the smart glasses and a head-mounted camera or camera-phone according to some embodiments.
Figure 12B:
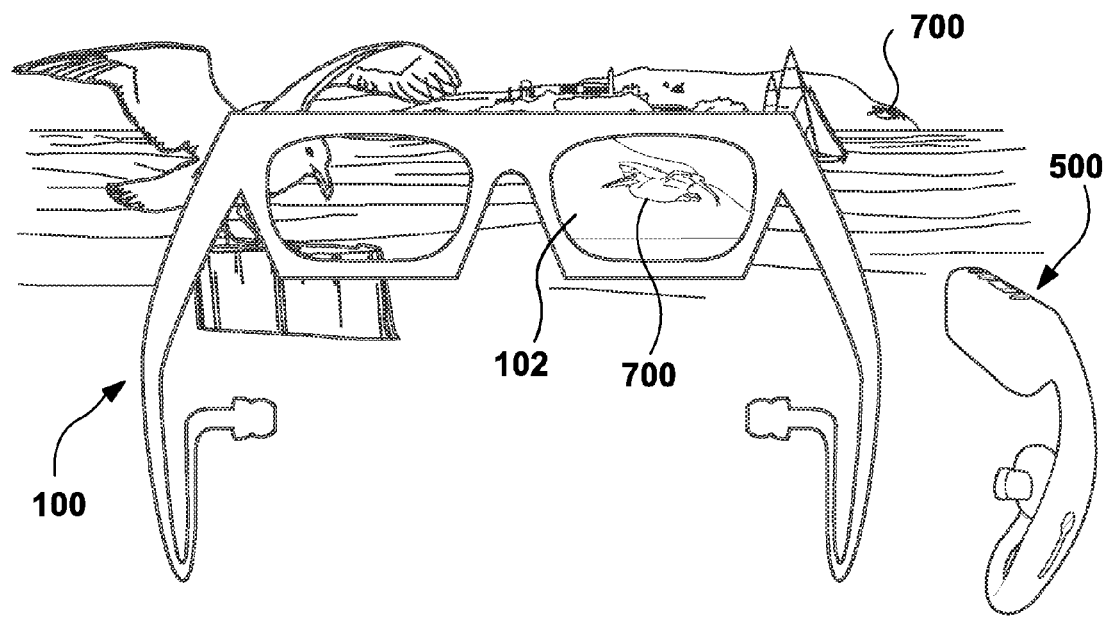

FIGS. 12A and 12 B depict wireless communication between the smart glasses and a head-mounted camera or camera-phone according to some embodiments. The depicted head-mounted camera phone 500 is able to dock next to the eyeglasses 100. In this case, the smart glasses 100 would not require an earphone 112 since one is provided by the camera-phone 500. The camera-phone is able to wirelessly transmit its video feed to the smart glasses, which in turn can display the video content in the head-up display glasses, according to some embodiments. The wireless communication 501 can be two-way, so that the smart glasses 100 are able to transmit instructions to the camera-phone. 500 For example, tracking of eye movements can be used to instruct the camera-phone as what target object to zoom in and focus on.

Figure 13A:
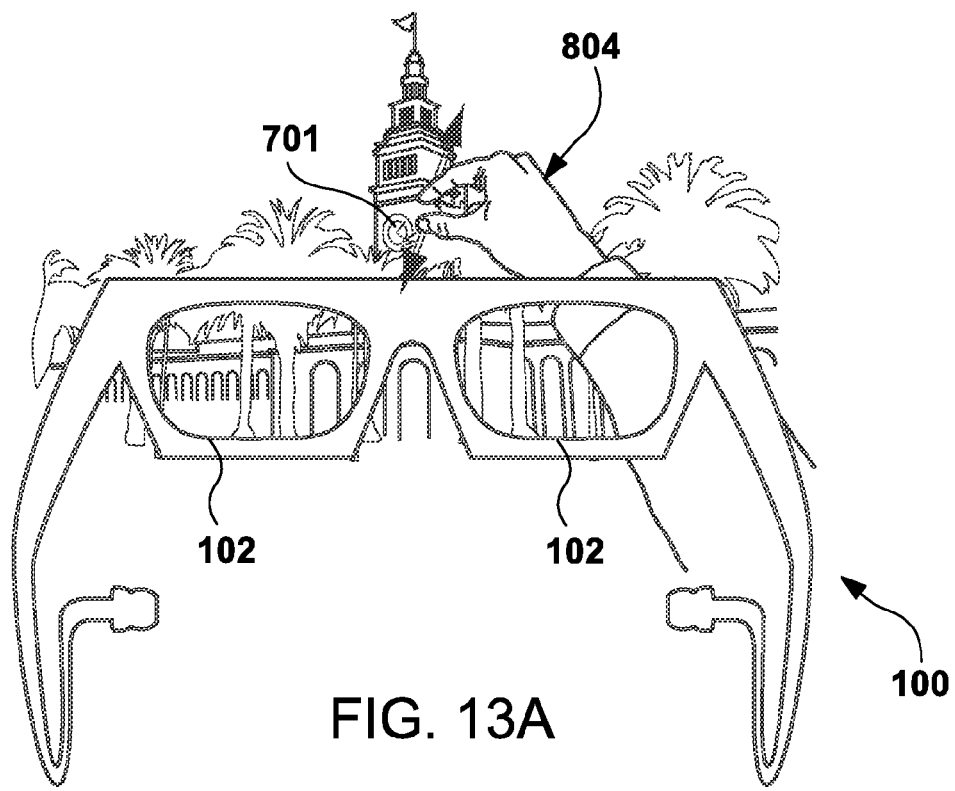
FIGS. 13A and 13B illustrate the smart glasses' ability to detect and track hand movements and gesture patterns according to some embodiments.
Figure 13B:
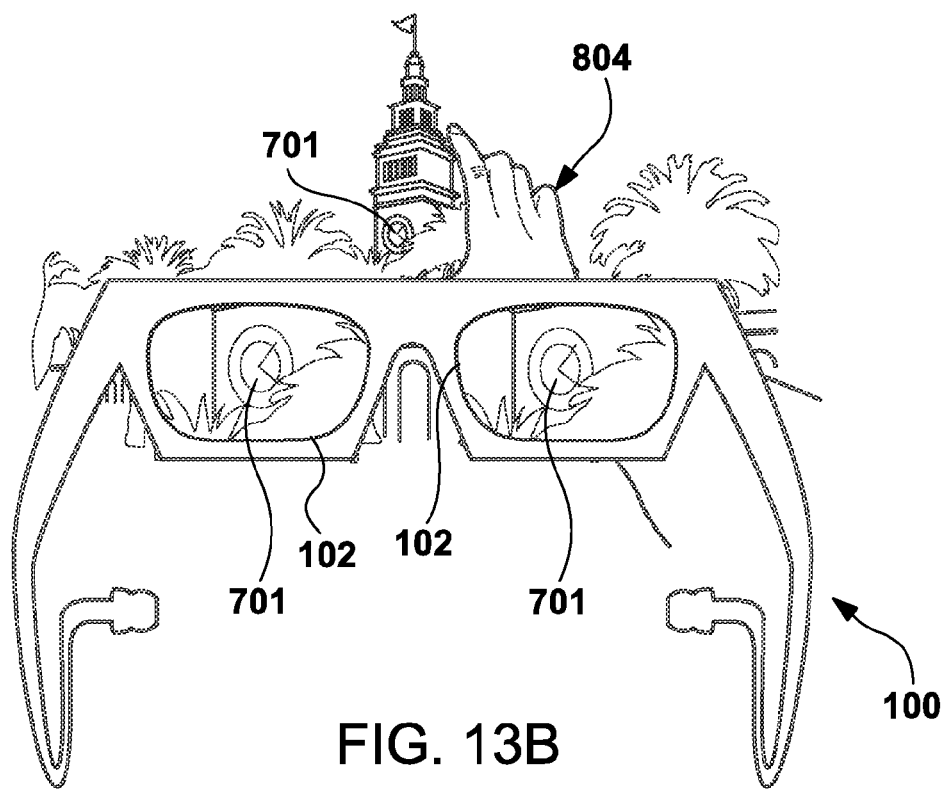

FIGS. 13A and 13B illustrate the smart glasses' ability to detect and track hand movements and gesture patterns according to some embodiments. The user is able to control the smart glasses functions by detecting and tracking the hand movements 804 and gesture patterns. In this depiction, the user has used a reverse-pinching gesture to isolate the clock 701 on a distant clock tower and zoom in on this target subject. The dual zoom cameras automatically zoom in on the clock and the heads-up display glasses display live video footage of the zoomed-in clock 701 so that the user can determine the time of day.

Figure 14:
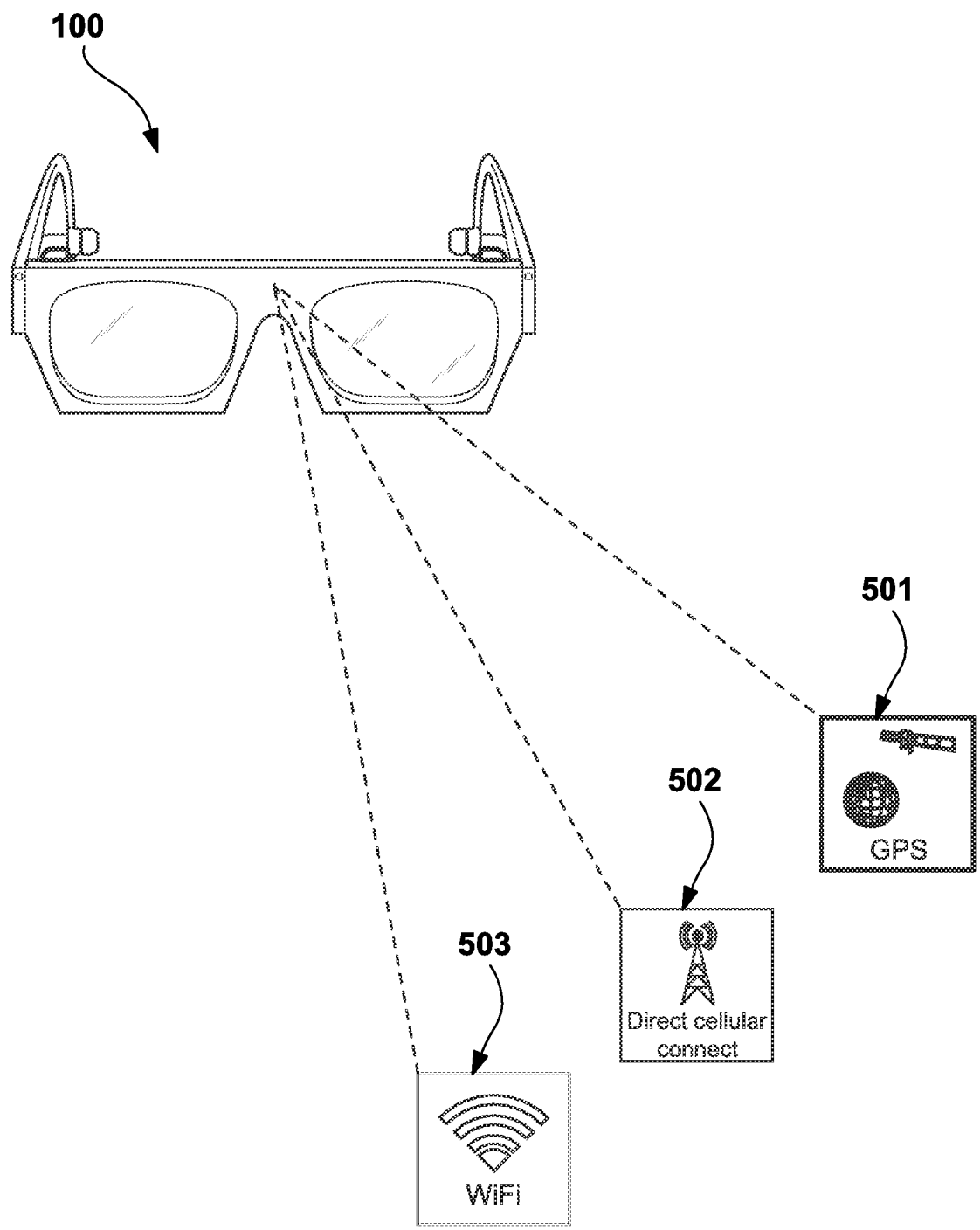
FIG. 14 depicts the ability of the smart glasses to wirelessly communicate with telecommunications networks using WiFi, mobile cellular connections, satellites and global positioning systems according to some embodiments.

FIG. 14 depicts the ability of the smart glasses to wirelessly communicate with telecommunications networks using WiFi 503, mobile cellular connections 502, satellites and global positioning systems 501 according to some embodiments.

Figure 15A:
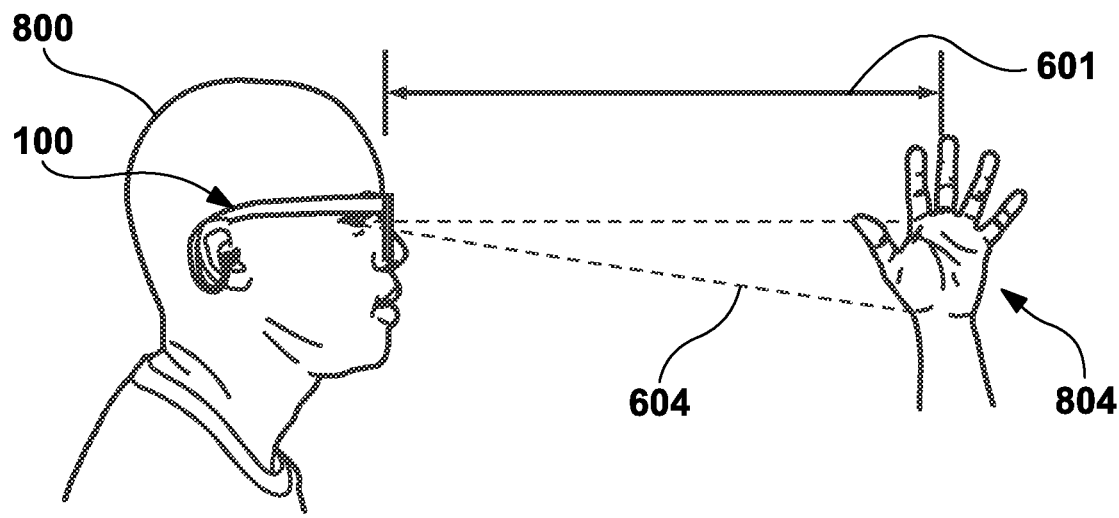
FIGS. 15A and 15B depict the ability of the smart glasses to measure distances according to some embodiments.
Figure 15B:
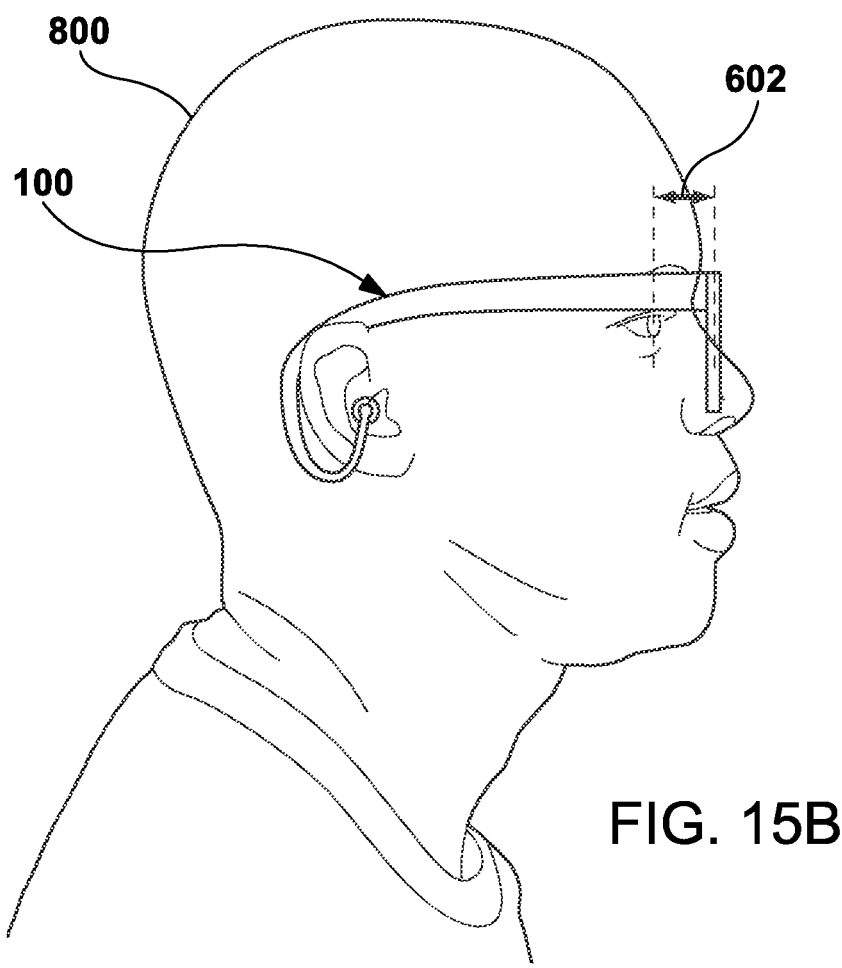

FIGS. 15A and 15B depict the ability of the smart glasses to measure distances 601,602,604 according to some embodiments. The smart glasses 100 are configured to measure remote objects using cameras and infra-red sensors and also measure the distance 604 between the head-up display glasses and the wearer's eyes.

Figure 16A:
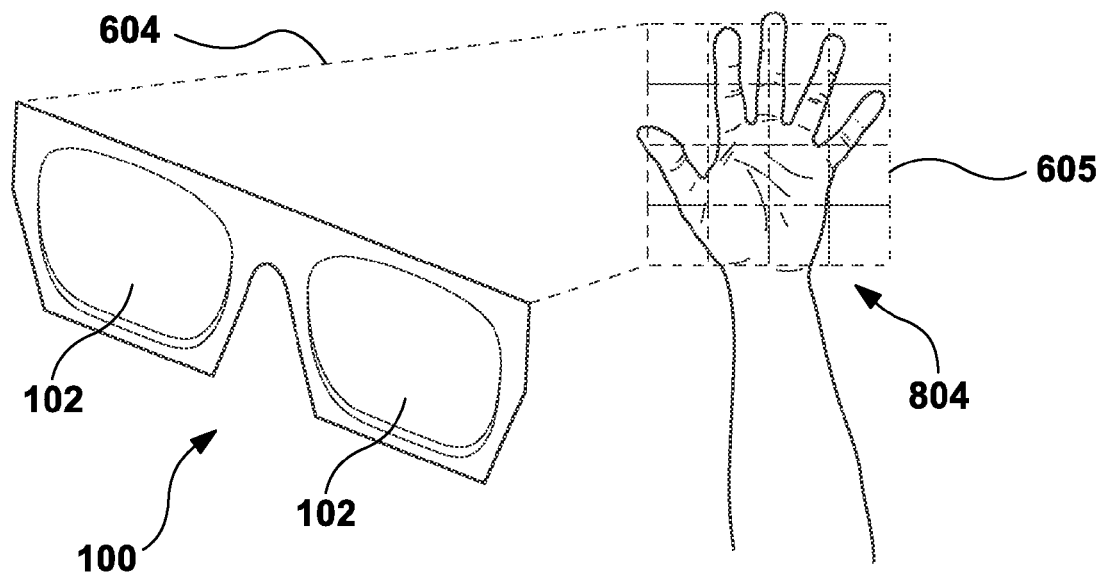
FIGS. 16A and 16B depict the ability of the smart glasses to map the area of a hand and assign sectors to it according to some embodiments.
Figure 16B:
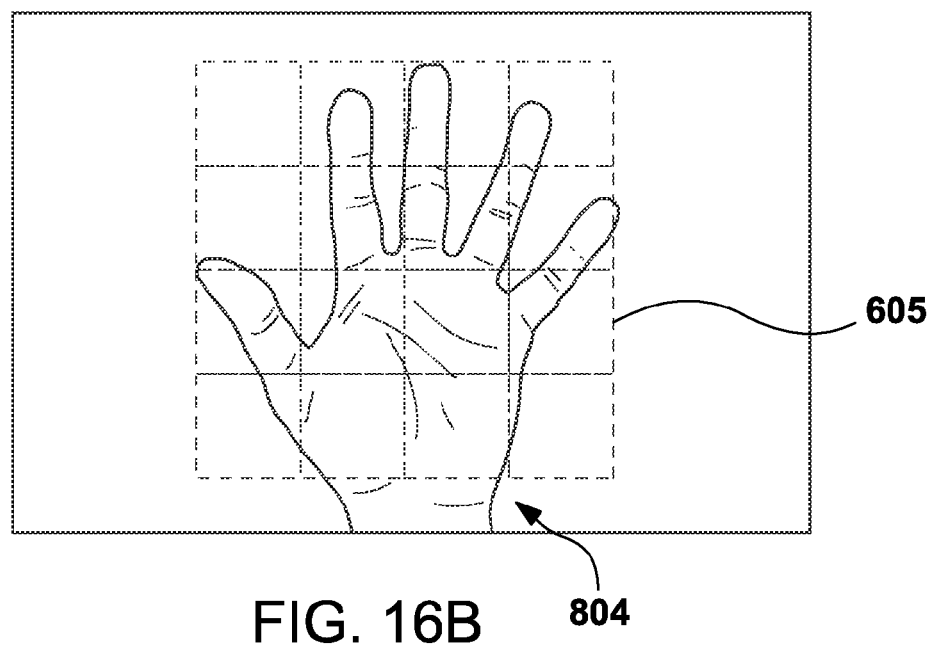
Figure 17A:
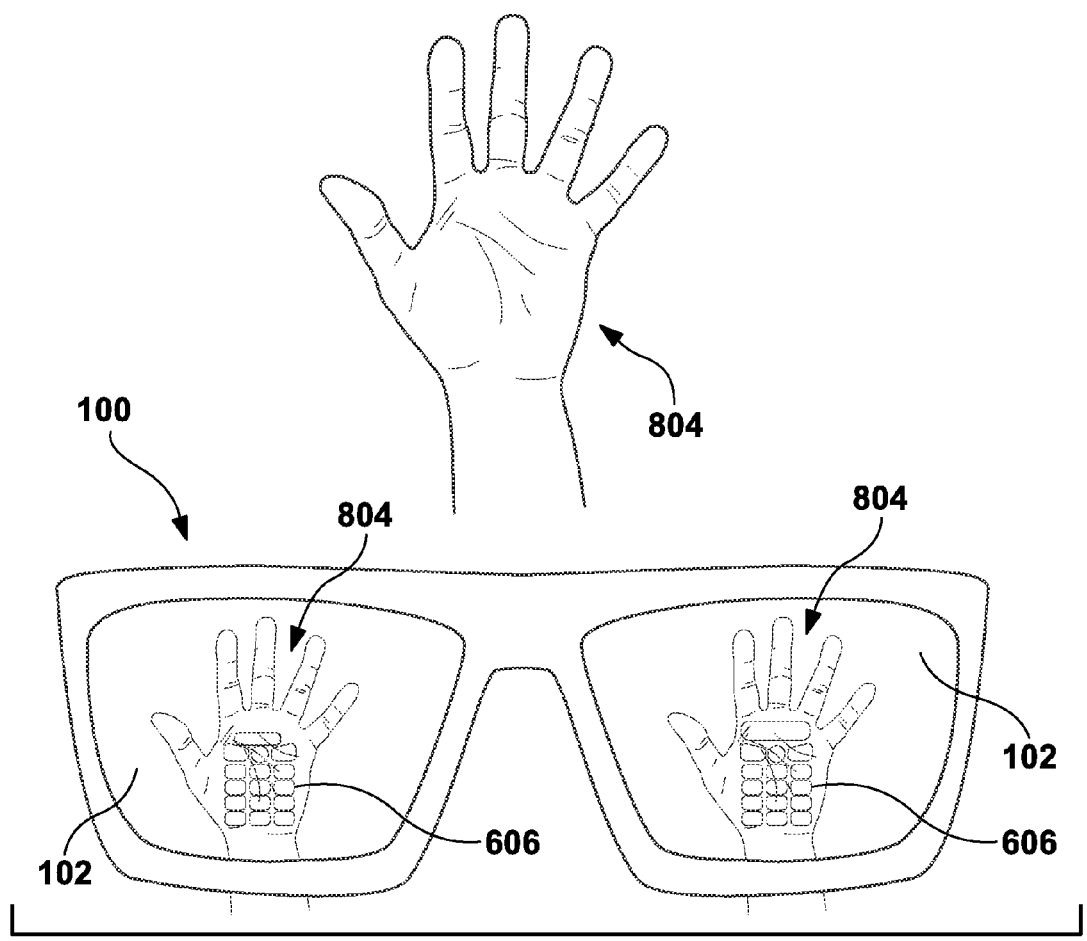
FIGS. 17A and 17B depict the ability of the smart glasses to project a virtual keypad onto a representation of the user's hand in the head-up display according to some embodiments.
Figure 17B:
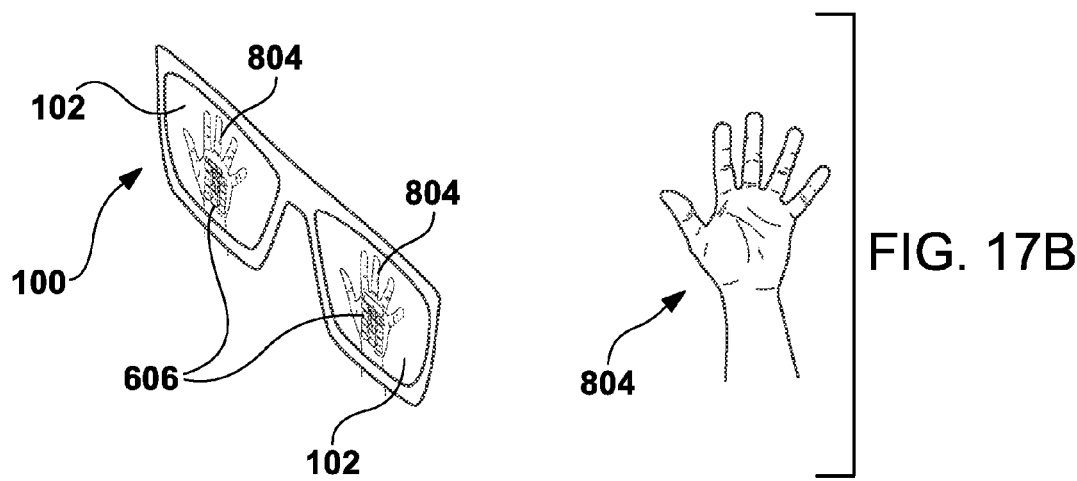

FIGS. 16A and 16B depict the ability of the smart glasses to map the area 605 of a hand 804 and assign sectors to it according to some embodiments;

FIGS. 17A and 17B depict the ability of the smart glasses 100 to project a virtual keypad 606 onto a representation of the user's hand 804 in the head-up display according to some embodiments. The user is able to then "click" on the "buttons" in this virtual keypad 606 in real space by touching the surface of the hand with a finger of the other hand or by sequentially focusing his or her eyes and momentarily pausing on each of the virtual buttons to be selected. The eye-tracking sensors can track eye movement and the forward-facing IR sensors and cameras can track hand movements for this purpose. The smart glasses do not need to project an actual image onto the hand in front of them, but this is also an option according to some embodiments.

Figure 18A:
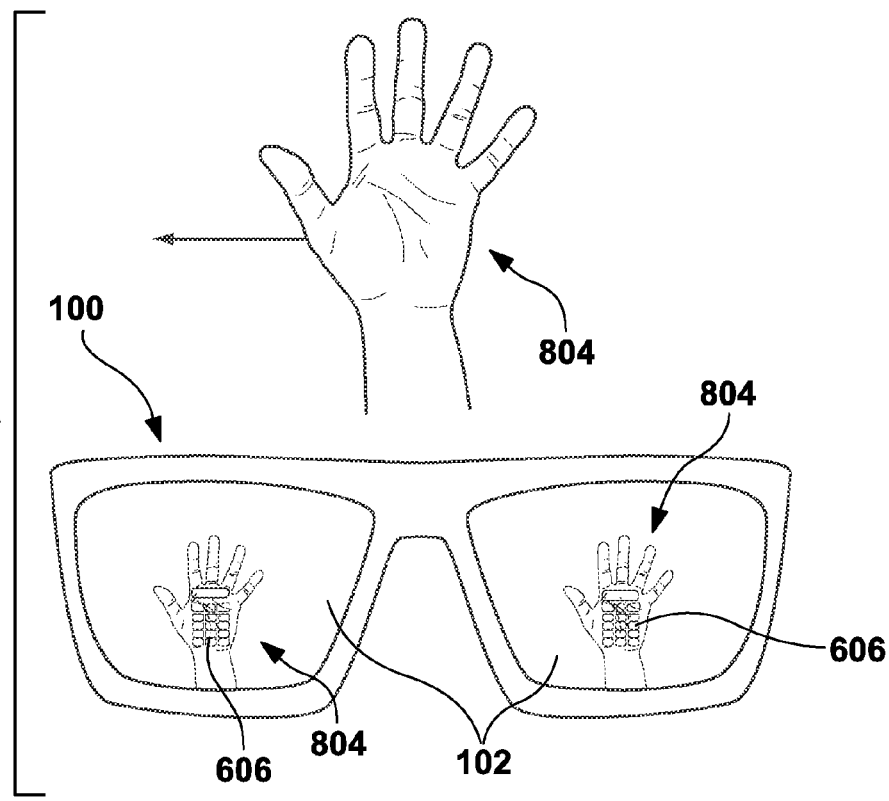
FIGS. 18A and 18B depict the ability of the smart glasses track the movement of the user's hand according to some embodiments.
Figure 18B:
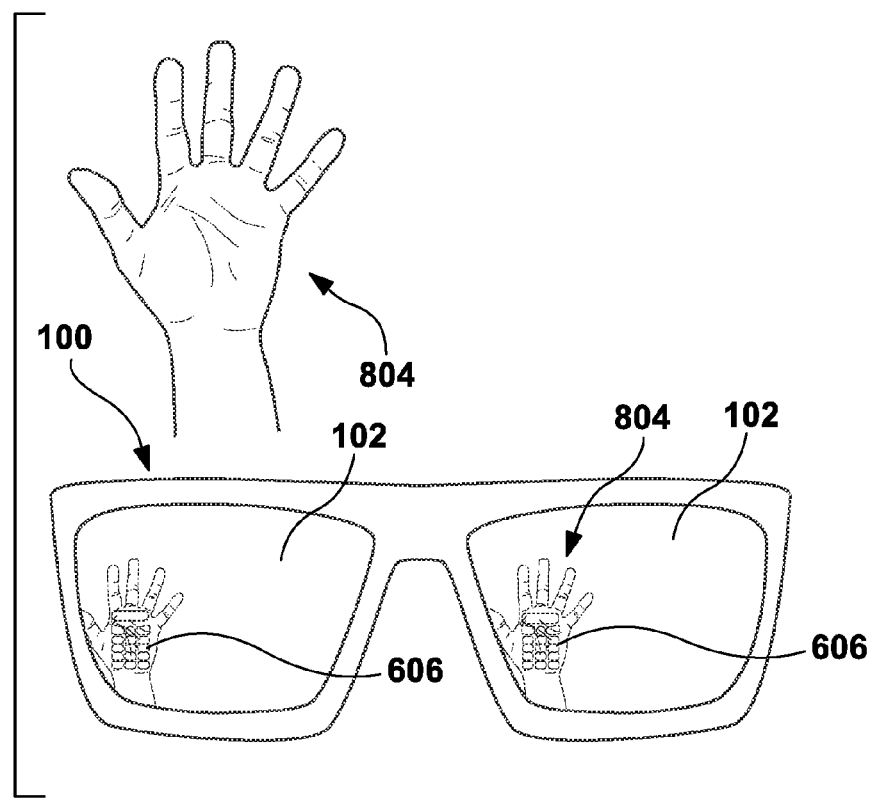

FIGS. 18A and 18B depict the ability of the smart glasses to track the movement of the user's hand according to some embodiments. The smart glasses 100 are configured to track the movement and dynamically update the position of the virtual keypad representation 606 of the user's hand 804 in the heads-up display.

Figure 19A:
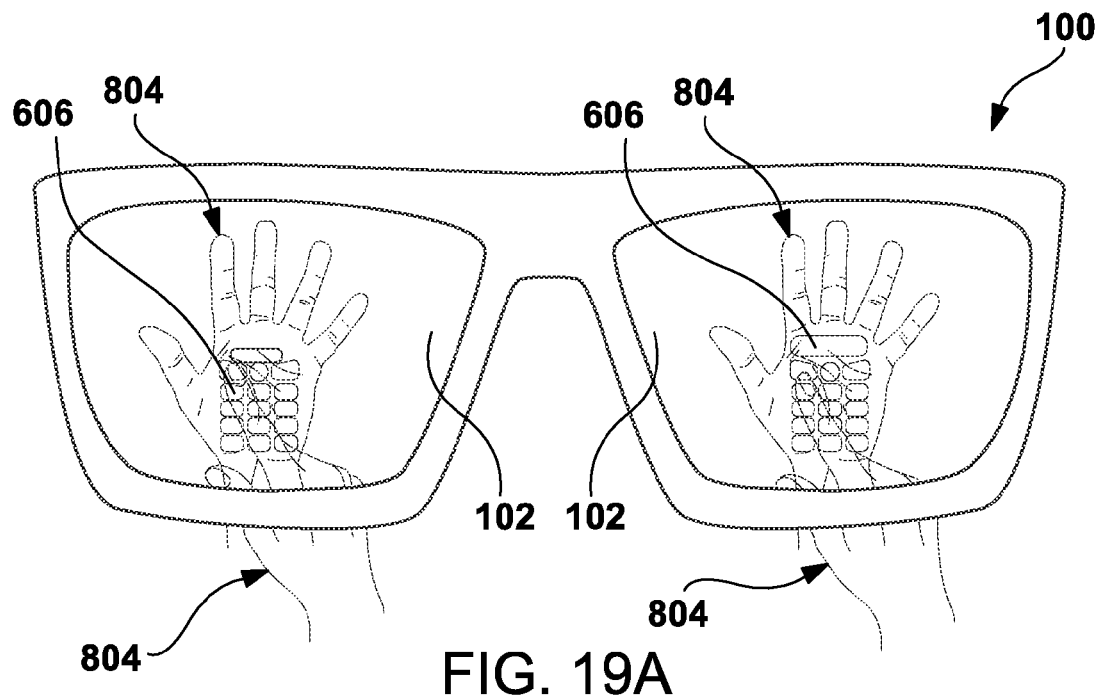
FIGS. 19A and 19B depict the user using his or her free hand to dial a phone number on a virtual keypad according to some embodiments.
Figure 19B:
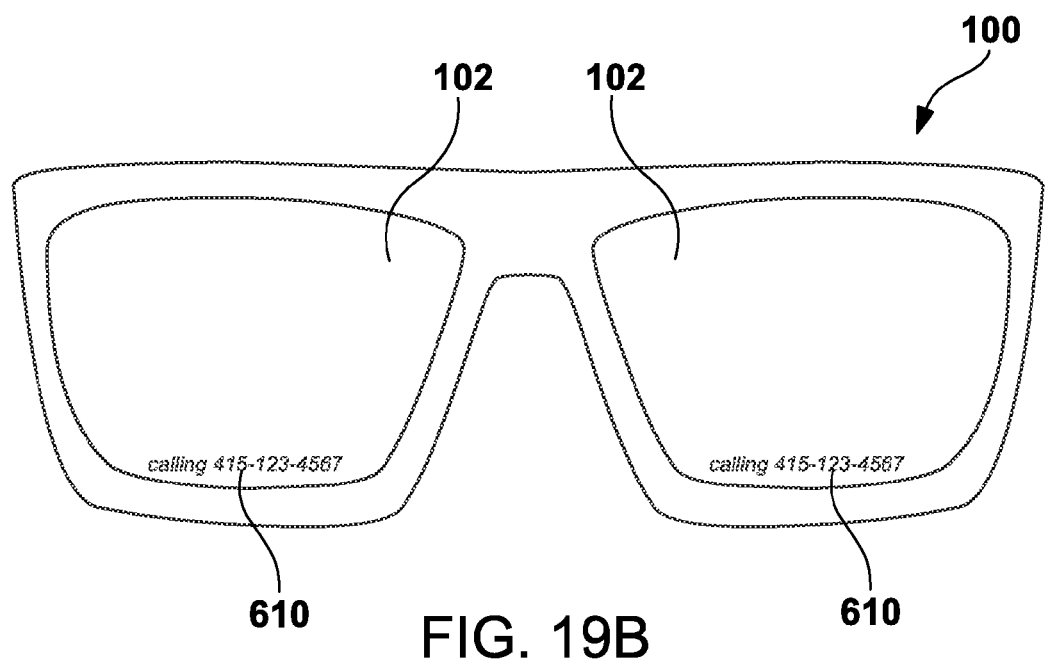

FIGS. 19A and 19B depict the user using his or her free hand to dial a phone number on a virtual keypad according to some embodiments. The smart phones are configured to generate and project the virtual keypad 606 onto a representation of the user's hand in the head-up display. The heads-up display glasses then display the selected numbers as they are being called.

Figure 20A:
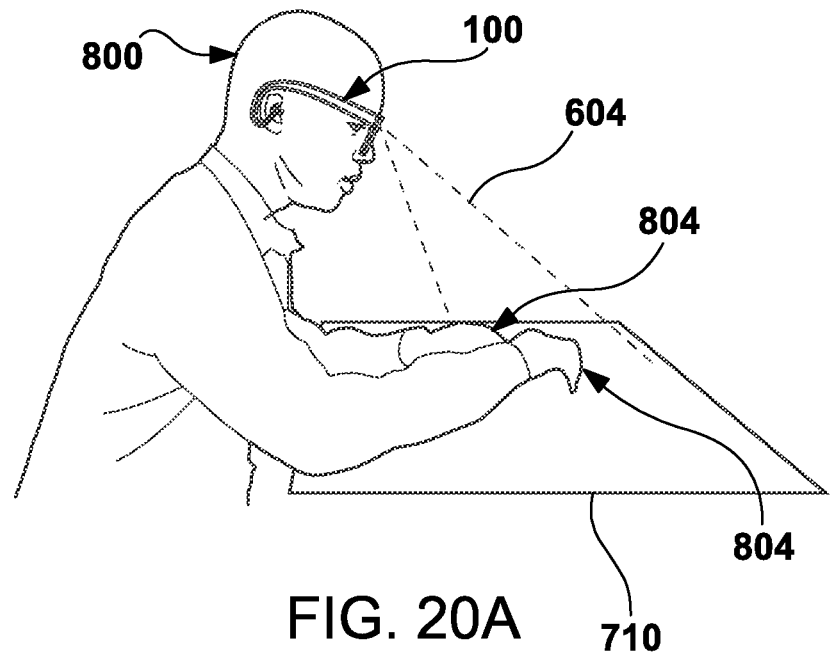
FIGS. 20A and 20B depict the ability of the smart glasses to project a virtual keyboard onto a representation of a surface according to some embodiments.
Figure 20B:
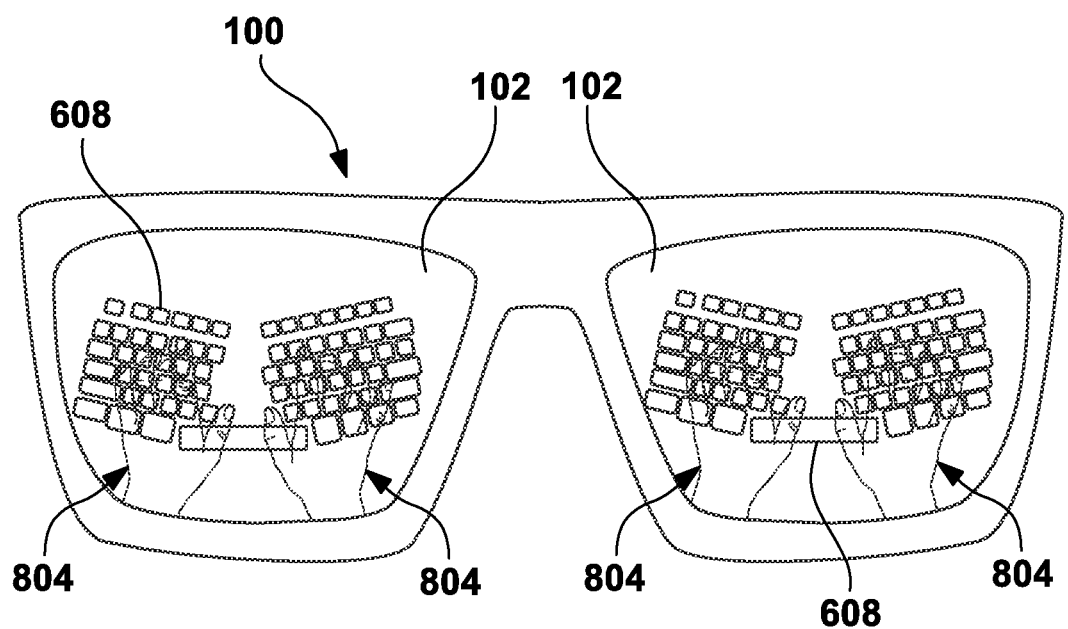

FIGS. 20A and 20B depict the ability of the smart glasses to project a virtual keyboard onto a representation of a surface according to some embodiments. The smart glasses 100 are configured to project 604 the representation 608 on surfaces 710 such as a desk or wall in front of the user. The smart glasses 100 are able to correctly adjust the virtual keyboard 608 to the distance and angle of the surface. The user's hands 804 can either been seen through the translucent heads-up display as they type, or the head's up display can project a video feed of the hands.

Figure 21A:
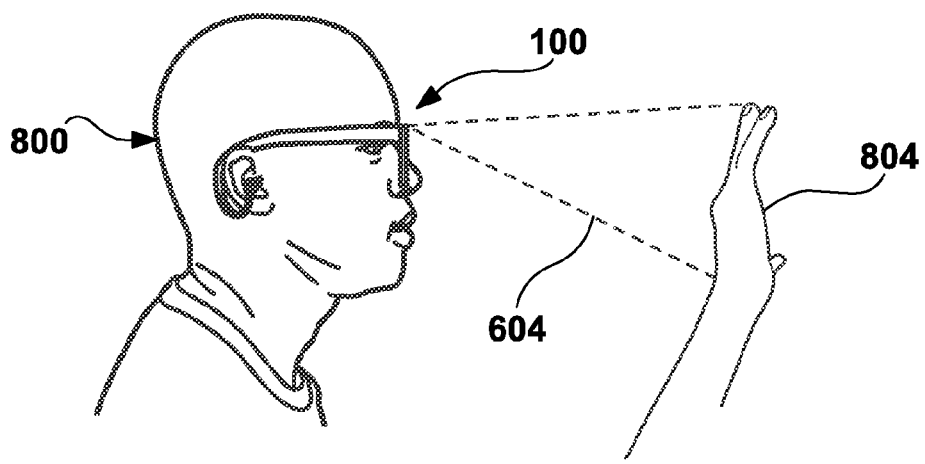
FIG. 21A through 21C depict the ability of the smart glasses to detect hand movements and gestures according to some embodiments.
Figure 21B:
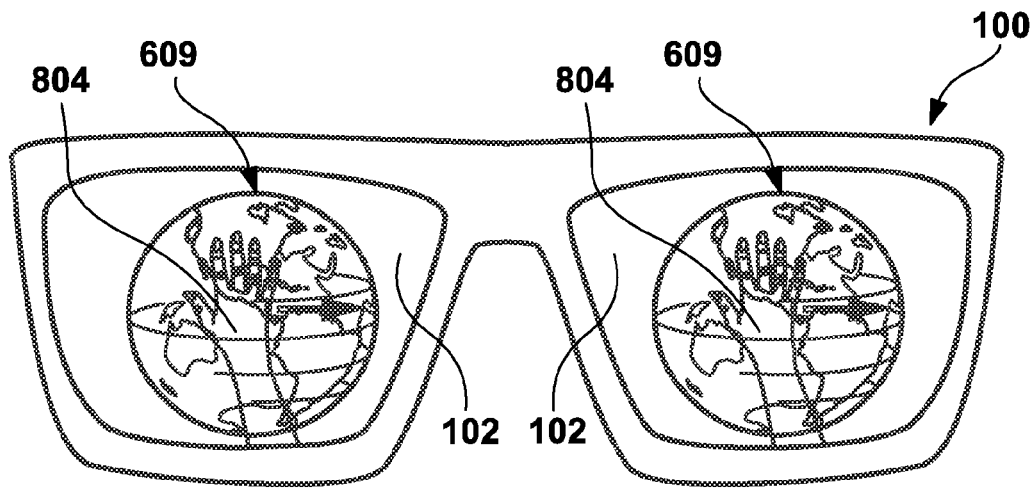
Figure 21C:
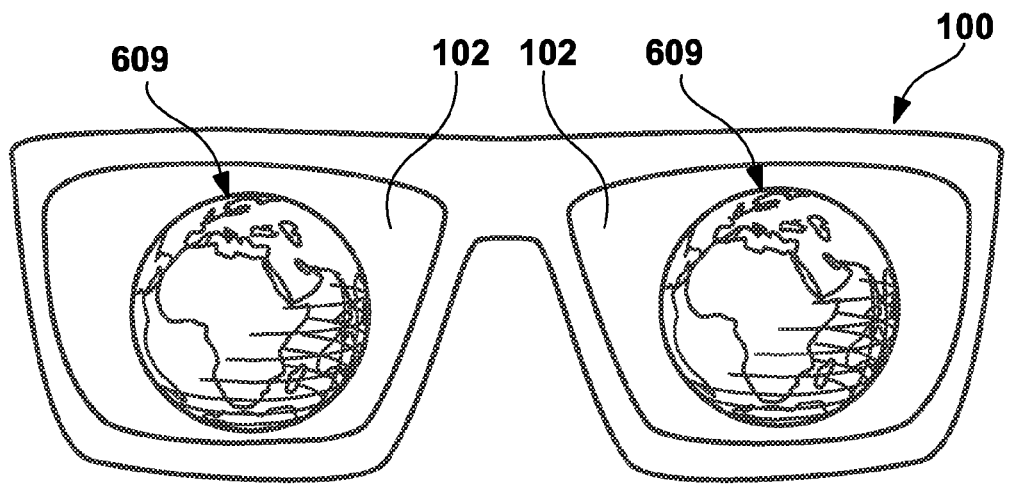

FIG. 21A through 21C depict the ability of the smart glasses to detect hand movements and gestures according to some embodiments. The smart glasses 100 are configured to detect movements and gestures so that the user can interact with virtual content that is displayed in the heads-up displays. In this depiction, the user is able to spin a representation of the earth 609 by turning his hand or by placing his hand 804 in position on the virtual globe as he sees it and spinning the globe.

Figure 22A:
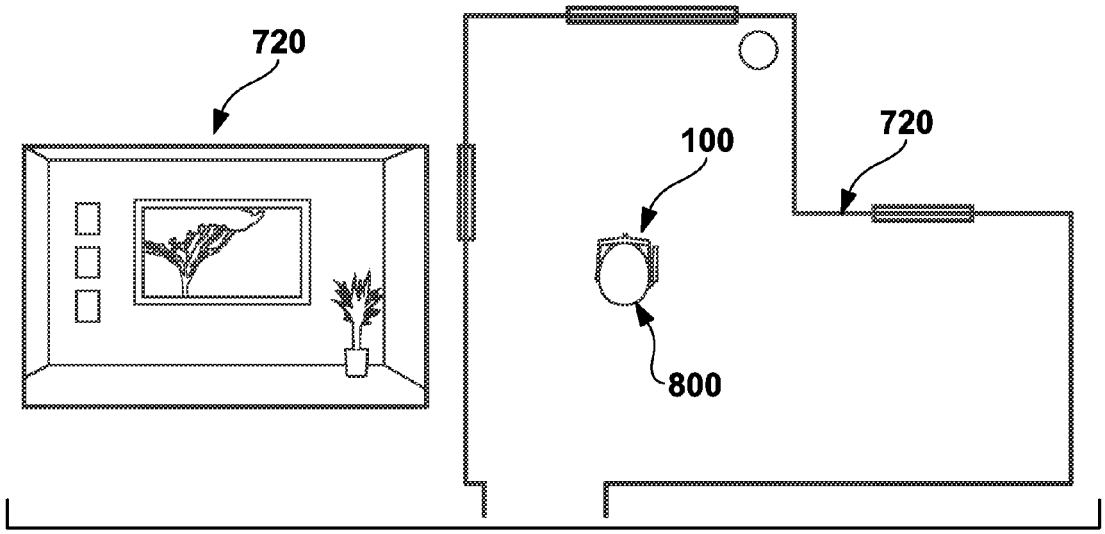
FIG. 22A through 22C depict the ability of the smart glasses to add virtual representations of furniture to the head-up display according to some embodiments.
Figure 22B:
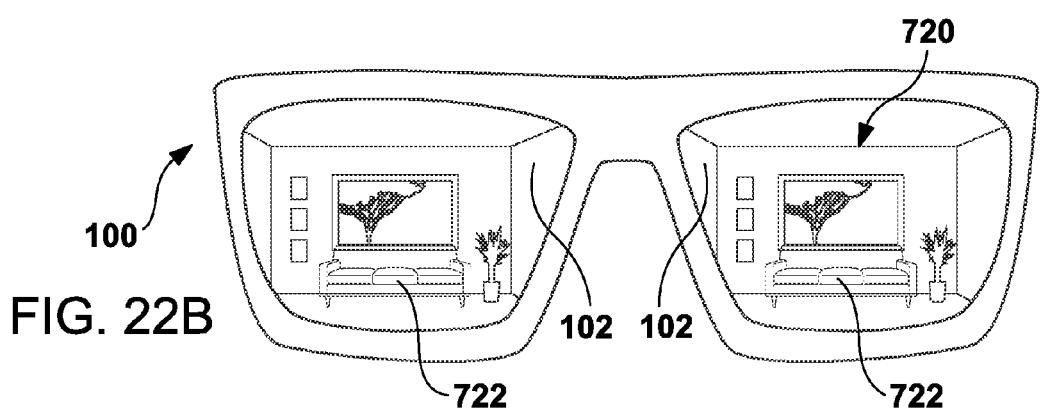
Figure 22C:
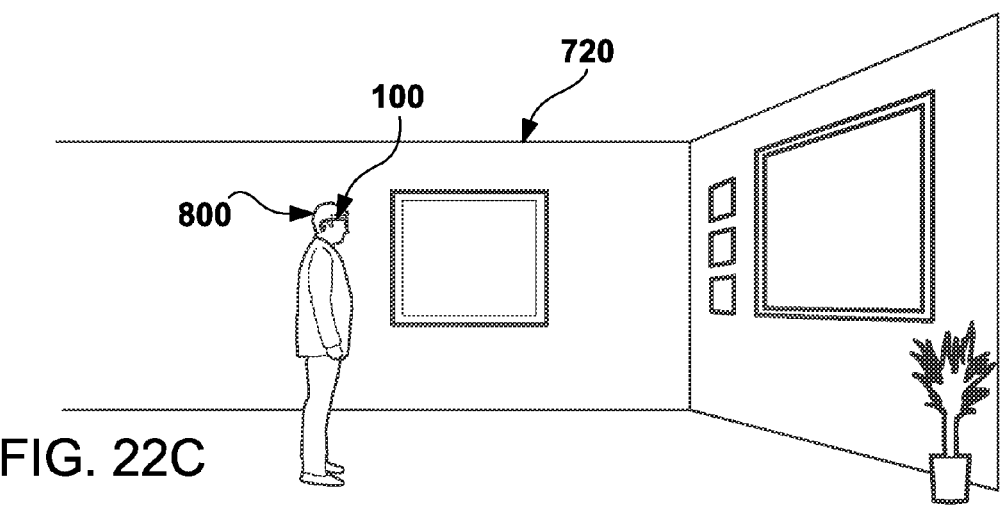
Figure 23A:
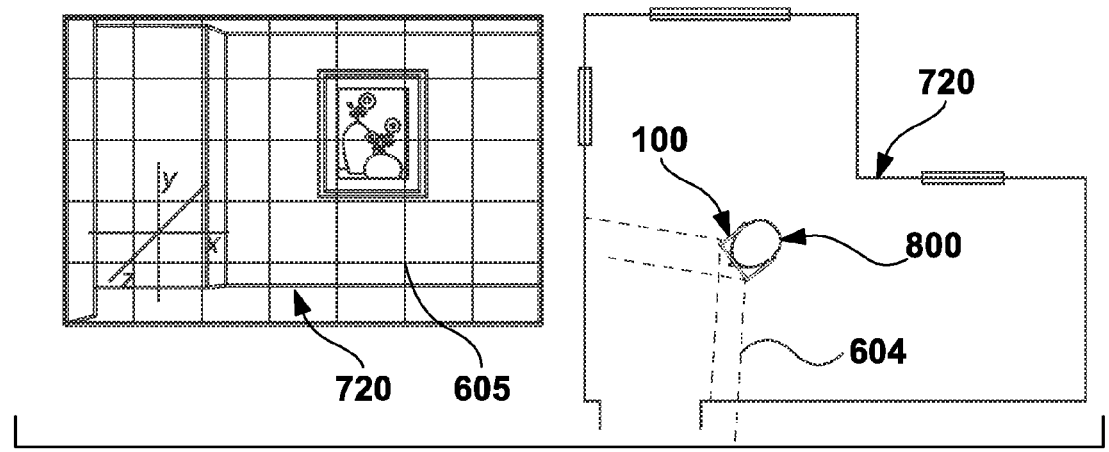
FIGS. 23A-23C and 24A-24B depict smart glasses being utilized for virtual representations according to some embodiments.
Figure 23B:
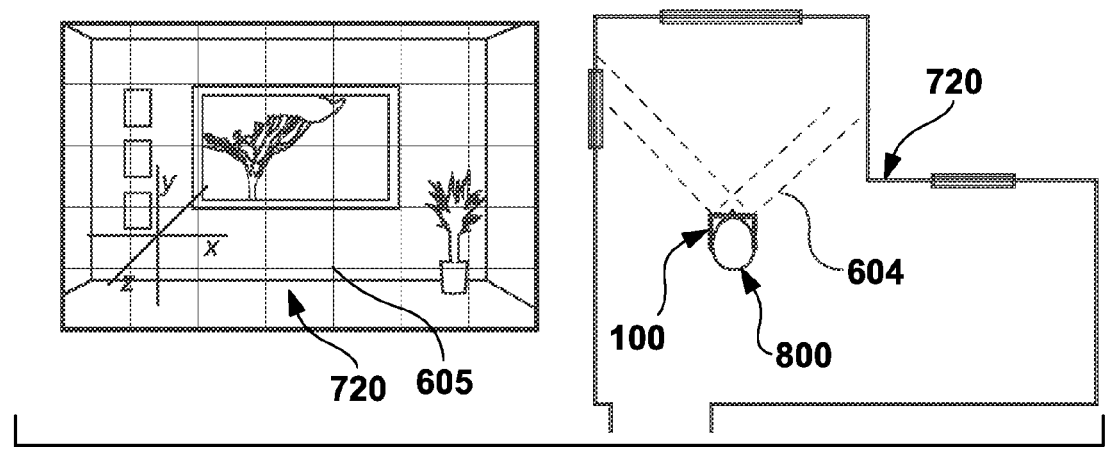
Figure 23C:
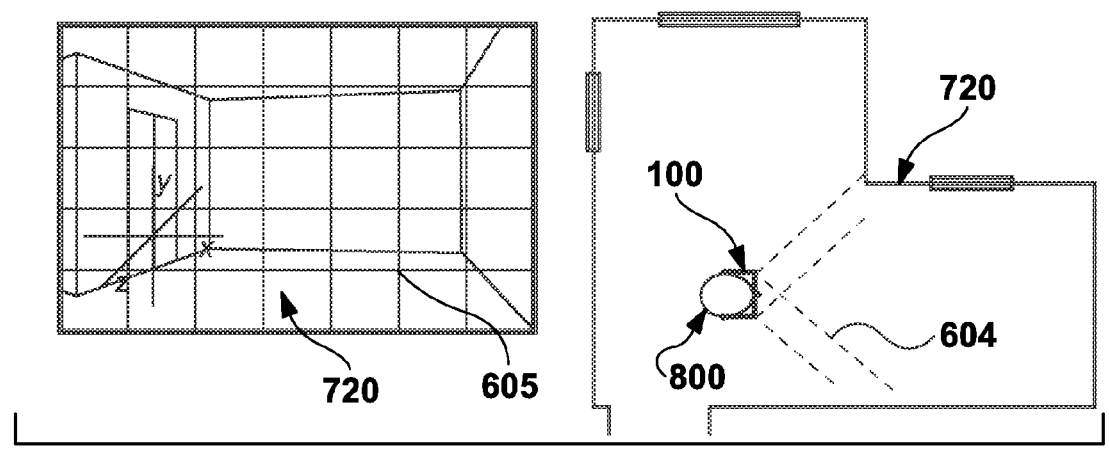
Figure 24A:
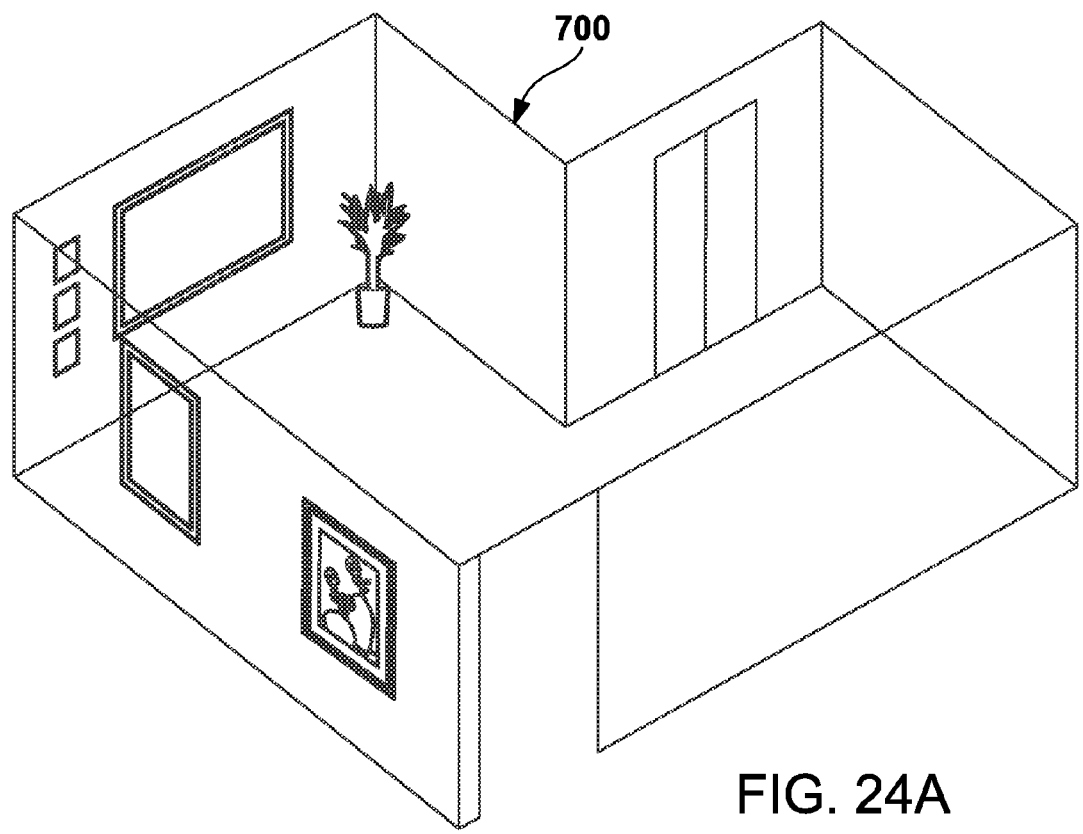
Figure 24B:
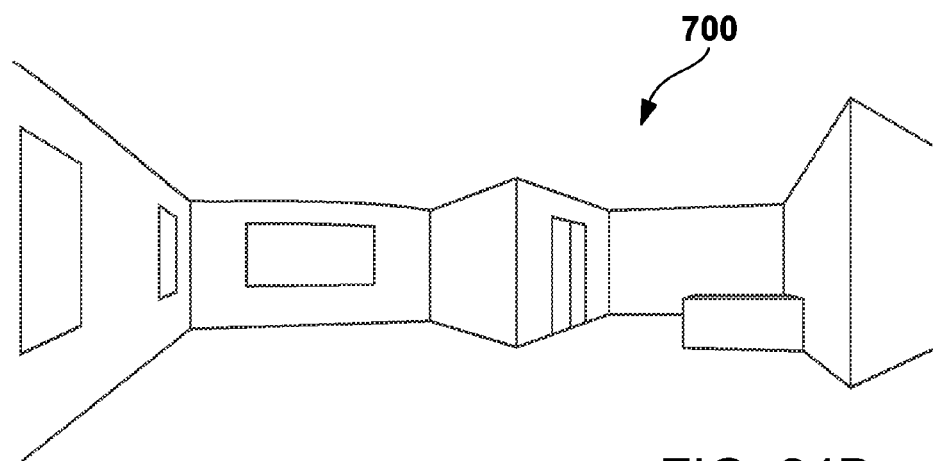

FIG. 22A through 22C depict the ability of the smart glasses to add virtual representations of furniture to the head-up display according to some embodiments. The smart glasses 100 are configured to add the representations such that the furniture 722 looks like it is in the a real environment 720 in front of the glasses. The user can use this to "try out" different furniture styles, colors and positions in a room to see how they will look. Virtual imagery of said furniture can be selected and downloaded by the user by using the head-up display glasses to browse through an Internet-based database of photographs or 3D models.

FIGS. 23A through 23C and 24A through 24B show further examples of the smart glasses in use.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An apparatus comprising
a pair of eyeglasses having a frame and lenses mounted on said frame;
a computer processor mounted on said eyeglasses;
a digital display, mounted in one or both of said lenses;
a plurality of digital cameras operably connected to said computer processor;
a digital projection system, said plurality of digital cameras and digital projection system being mounted on said eyeglasses; and
dual inward-facing eye motion tracking sensors, integrated into the frame, and operably connected to said computer processor;
wherein said plurality of digital cameras comprise dual forward-facing cameras for recording wide angle and/or stereographic video or still image content and wherein said plurality of digital cameras further comprise side view and rear view multi-directional lens array for 360 degree image and video; and
wherein said computer processor is configured to determine a wearer's distant point of focus and control zoom and focusing functions of said camera(s) according to tracking of the wearer's eye movements by said tracking sensors.

2. The apparatus of claim 1, wherein said computer processor is configured to cause one of said plurality of cameras to zoom in on an object of interest visible from a camera feed of one of said plurality of cameras according to said tracking of said wearer's eye movements and/or point of focus.

3. The apparatus of claim 1, wherein said plurality of cameras comprise extendable cameras, wherein said eyeglasses include arms and recessed tracks in said arms and wherein said extendable cameras and tracks are configured such that said extendable cameras are swivelable and bendable between a stored position in which said extendable cameras are stored in said recessed tracks when not in use and an operating position in which said extendable cameras are swiveled out from said tracks and bent in a desired orientation.

4. The apparatus of claim 1, further comprising IR sensors and/or dual zoom cameras mounted on said smart glasses and configured to detect and track hand movements and gesture patterns and control said smart glasses in response thereto.

5. The apparatus of claim 1, further comprising motion sensors mounted on said eyeglasses and configured to detect head motion; and said processor being configured to activate a video scroll feature on said digital display in response to receiving head motion detection from said motion sensors.

6. The apparatus of claim 1, wherein said digital projection system is configured to project a virtual keypad onto a representation of the user's hand in the head-up display.

7. An apparatus comprising
a pair of eyeglasses having a frame and lenses mounted on said frame;
a computer processor mounted on said eyeglasses;
a digital display, mounted in one of said lenses;
a plurality of digital cameras operably connected to said computer processor; and
a digital projection system, said plurality of digital cameras and digital projection system being mounted on said eyeglasses;
wherein said plurality of digital cameras comprise dual forward-facing cameras for recording wide angle and/or stereographic video or still image content and wherein said plurality of digital cameras further comprise side view and rear view multi-directional lens array for 360 degree image and video; and
wherein said computer processor is configured to control said plurality of cameras and generate a 360 degree surround video feed using camera feeds from said plurality of cameras; and
further comprising dual inward-facing eye motion tracking sensors, integrated into the frame, for tracking a wearer's eye movements; wherein said computer processor is configured to determine a wearer's distant point of focus and control zoom and focusing functions of said camera(s) according to tracking of the wearer's eye movements and/or point of focus by said tracking sensors.

8. The apparatus of claim 7, wherein said plurality of cameras comprise extendable cameras, wherein said eyeglasses include arms and recessed tracks in said arms and wherein said extendable cameras and tracks are configured such that said extendable cameras are swivelable and bendable between a stored position in which said extendable cameras are stored in said recessed tracks when not in use and an operating position in which said extendable cameras are swiveled out from said tracks and bent in a desired orientation.

9. The apparatus of claim 7, further comprising IR sensors and/or dual zoom cameras mounted on said smart glasses and configured to detect and track hand movements and gesture patterns and control said smart glasses in response thereto.

10. An apparatus comprising
a pair of eyeglasses having a frame and lenses mounted on said frame;
a computer processor mounted on said eyeglasses;
a digital display, mounted in one of said lenses; and
a plurality of digital cameras operably connected to said computer processor;
a digital projection system, said plurality of digital cameras and digital projection system being mounted on said eyeglasses; and IR sensors and/or dual zoom cameras, operably connected to said computer processor, mounted on said smart glasses and configured to detect and track hand movements and gesture patterns and control said smart glasses in response thereto; and
wherein said computer processor is configured to control the zoom camera most proximate to the hand to take on the role of focusing on the hand while the other camera continues to feed video footage of a scene to the display projection system.

11. The apparatus of claim 10, wherein said plurality of digital cameras include side-facing and rear-facing cameras for recording a 360 degree surround video feed.

12. The apparatus of claim 10, further comprising dual inward-facing eye motion tracking sensors, integrated into the frame, for tracking a wearer's eye movements; wherein said computer processor is further configured to determine a wearer's distant point of focus and control zoom and focusing functions of said camera(s) according to tracking of the wearer's eye movements and/or point of focus by said tracking sensors.

13. The apparatus of claim 10, wherein said plurality of cameras comprise extendable cameras, wherein said eyeglasses include arms and recessed tracks in said arms and wherein said extendable cameras and tracks are configured such that said extendable cameras are swivelable and bendable between a stored position in which said extendable cameras are stored in said recessed tracks when not in use and an operating position in which said extendable cameras are swiveled out from said tracks and bent in a desired orientation.

14. The apparatus of claim 10, further comprising motion sensors mounted on said eyeglasses and configured to detect head motion; and said processor being configured to activate a video scroll feature on said digital display in response to receiving head motion detection from said motion sensors.

\* \* \* \* \*